United States Patent
Kamiyama et al.

(10) Patent No.: US 8,991,217 B2
(45) Date of Patent: Mar. 31, 2015

(54) MOLD, CASTING APPARATUS, AND METHOD FOR PRODUCING CAST ROD

(75) Inventors: Yuma Kamiyama, Osaka (JP); Kazuyoshi Honda, Osaka (JP); Daisuke Suetsugu, Osaka (JP)

(73) Assignee: Panasonic Corporation, Osaka (JP)

( * ) Notice: Subject to any disclaimer, the term of this patent is extended or adjusted under 35 U.S.C. 154(b) by 245 days.

(21) Appl. No.: 13/702,019

(22) PCT Filed: May 9, 2012

(86) PCT No.: PCT/JP2012/003039
§ 371 (c)(1),
(2), (4) Date: Dec. 4, 2012

(87) PCT Pub. No.: WO2012/157214
PCT Pub. Date: Nov. 22, 2012

(65) Prior Publication Data
US 2013/0086947 A1     Apr. 11, 2013

(30) Foreign Application Priority Data
May 17, 2011   (JP) ................................ 2011-110304

(51) Int. Cl.
*C03B 19/02* (2006.01)
*C01B 33/02* (2006.01)
*B22D 11/045* (2006.01)

(52) U.S. Cl.
CPC .............. *B22D 11/045* (2013.01); *C03B 19/02* (2013.01); *C01B 33/02* (2013.01)
USPC .................. 65/361; 65/66; 164/451

(58) Field of Classification Search
CPC .. B22D 11/045; B22D 11/0455; C01B 33/02; C03B 17/00; C03B 17/06; C03B 19/02
USPC ...................... 65/66, 361; 164/451
See application file for complete search history.

(56) References Cited

U.S. PATENT DOCUMENTS

| | | | | |
|---|---|---|---|---|
| 4,589,468 A | * | 5/1986 | Misera et al. | 164/418 |
| 6,619,377 B1 | * | 9/2003 | Etay et al. | 164/466 |

(Continued)

FOREIGN PATENT DOCUMENTS

| | | |
|---|---|---|
| CN | 201620208 U | 11/2010 |
| JP | S56-84156 A | 7/1981 |

(Continued)

OTHER PUBLICATIONS

International Search Report issued in International Patent Application No. PCT/JP2012/003039 dated Jul. 24, 2012.

(Continued)

*Primary Examiner* — Cynthia Szewczyk
(74) *Attorney, Agent, or Firm* — McDermott Will & Emery LLP

(57) ABSTRACT

Arnold (13) includes a recessed portion (21) for receiving a melt (2). The recessed portion (21) is constituted by an inner wall surface (29) for converting the melt (2) into a solidified portion when the inner wall surface (29) contacts the melt (2), and opens in a withdrawal direction (D1) of the solidified portion. A curved line formed by a first contour (23p) and a second contour (25p) has a cusp at a position of start points (43 and 45). The distance between the first contour (23p) and the second contour (25p) in a width direction (D2) increases continuously from an upstream side to a downstream side of the withdrawal direction (D1). The shape of the inner wall surface (29) of the recessed portion (21) is determined so that a cast rod (3) can be rotationally displaced clockwise or counterclockwise about an axis passing through a first end point (33) or a second end point (35) and perpendicular to a section of the mold 13.

18 Claims, 18 Drawing Sheets

(56) References Cited

U.S. PATENT DOCUMENTS

| | | | |
|---|---|---|---|
| 7,472,740 B2 * | 1/2009 | Anderson et al. | 164/461 |
| 2010/0196623 A1 | 8/2010 | Honda et al. | |
| 2011/0168081 A1 | 7/2011 | Li et al. | |

FOREIGN PATENT DOCUMENTS

| | | |
|---|---|---|
| JP | 04-266456 A | 9/1992 |
| JP | H05-169195 A | 7/1993 |
| JP | 05-213691 A | 8/1993 |
| JP | 07-256398 A | 10/1995 |
| JP | 07-256624 A | 10/1995 |
| JP | 4057831 B2 | 3/2008 |
| JP | 4331791 B2 | 9/2009 |
| WO | WO-2009/047879 A1 | 4/2009 |

OTHER PUBLICATIONS

Search Report issued in Chinese Application No. 201280001565.0 dated Feb. 11, 2014, with English Translation.

* cited by examiner

FIG.13A  Comparative Example 1
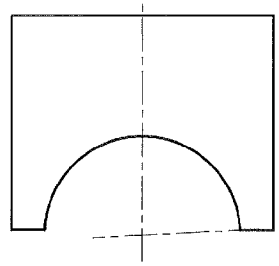
FIG.13B  Example 1
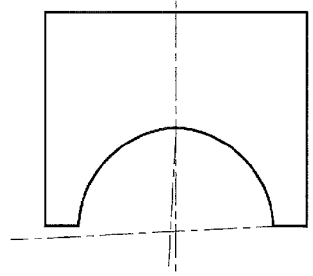
FIG.13C  Example 2
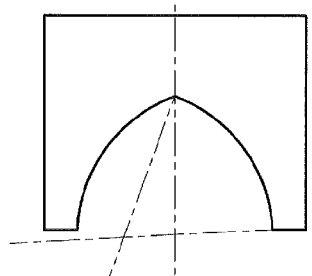
FIG.13D  Example 3
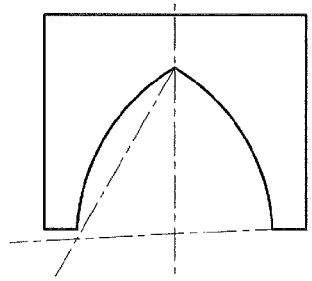

FIG.13E  Comparative Example 2
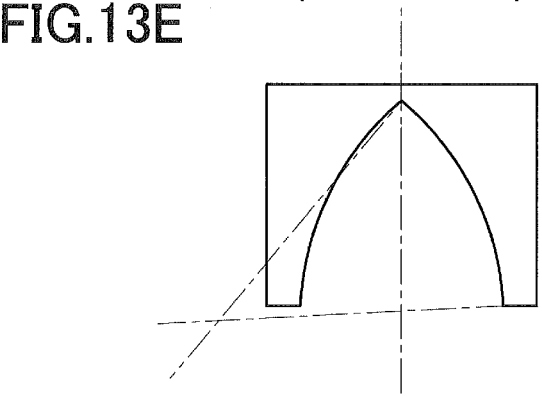
FIG.13F  Example 4
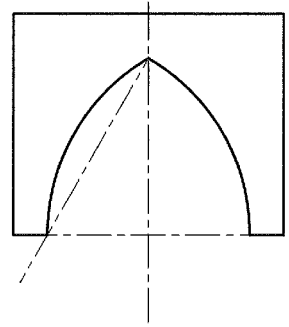
FIG.13G  Example 5
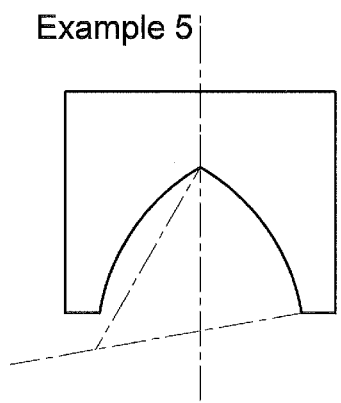

FIG.13H  Example 6
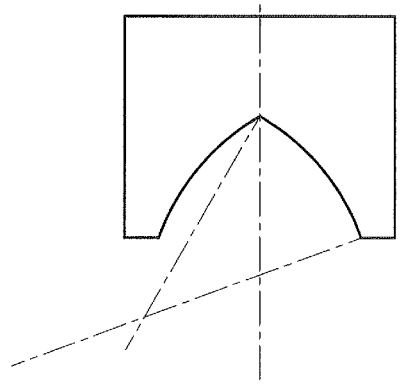
FIG.13I  Example 7
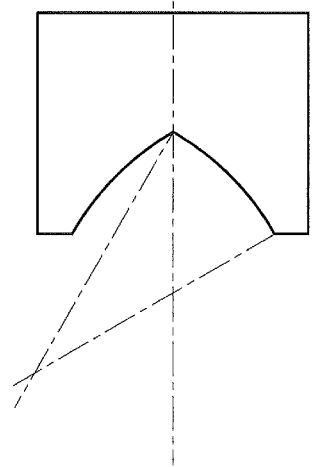

MOLD, CASTING APPARATUS, AND METHOD FOR PRODUCING CAST ROD

RELATED APPLICATIONS

This application is the U.S. National Phase under 35 U.S.C. §371 of International Application No. PCT/JP2012/003039, filed on May 9, 2012, which in turn claims the benefit of Japanese Application No. 2011-110304, filed on May 17, 2011, the disclosures of which Applications are incorporated by reference herein.

TECHNICAL FIELD

The present invention relates to a mold, a casting apparatus, and a method for producing a cast rod.

BACKGROUND ART

Casting is a technique used in the fields of steel and non-ferrous metal production. Continuous casting is known as one form of the casting technique. Continuous casting is a process including a step of withdrawing a cast rod formed in a mold in the vertical direction or the horizontal direction. A material is melted in a crucible, and the melt is poured into a pipe mold through a nozzle provided on the bottom of the crucible. In the mold, the material is continuously solidified and an obtained cast product is continuously withdrawn from the mold. Thus, a cast rod is obtained. In the case of horizontal continuous casting, it is also possible to drop a melt into a mold from a crucible or a tundish.

A mold is tapered to reduce frictional resistance acting on a cast rod when it is withdrawn and to prevent failure of withdrawal of the cast rod and breakage thereof. The mold is usually tapered, taking into account the volumetric shrinkage of a material such as steel during solidification, so that the width of the mold decreases in the withdrawal direction from the melt feeding side (see Patent Literatures 1 and 2).

Materials other than steel are also molded by casting in some cases. For example, silicon is not only added to metallic materials such as steel but also used for semiconductors, solar cells, etc. In particular, as methods for producing silicon for solar cells, attempts have been made to mold silicon by casting (see Patent Literatures 3 and 4).

The present inventors have proposed a method for obtaining a vapor-deposited film of silicon efficiently and at low cost by feeding silicon into a crucible using a silicon rod molded by casting (see Patent Literature 5).

CITATION LIST

Patent Literature

| | |
|---|---|
| Patent Literature 1 | JP 04(1992)-266456 A |
| Patent Literature 2 | JP 4057831 B2 |
| Patent Literature 3 | JP 07(1995)-256624 A |
| Patent Literature 4 | JP 05(1993)-213691 A |
| Patent Literature 5 | JP 4331791 B2 |

SUMMARY OF INVENTION

Technical Problem

Many materials including steel have the property of shrinking in volume as the density increases during solidification of the melt. However, silicon, like water, has the property of expanding during solidification. Therefore, if a conventional tapered mold used in the steel industry is used for the casting of silicon, a cast rod is pressed against the mold due to the expansion of silicon in the mold and cannot be withdrawn therefrom. Furthermore, if silicon begins to solidify unevenly in the mold, the cast rod is subjected to stress which causes axial displacement or rotation thereof in the mold. As a result, problems such as an increase in frictional resistance during withdrawal and a breakout may occur.

In view of the above circumstances, it is an object of the present invention to provide a mold suitable for the casting of materials that undergo volumetric expansion during solidification. It is another object of the present invention to provide a casting apparatus and a method for producing a cast rod each using this mold.

Solution to Problem

The present disclosure provides a mold for producing a cast rod of a material by feeding a melt of the material to the mold and while solidifying the fed material therein, withdrawing a solidified portion of the material. This mold includes a recessed portion for receiving the melt. In this mold, the recessed portion is constituted by an inner wall surface for converting the melt into the solidified portion when the inner wall surface contacts the melt, and opens in a withdrawal direction of the solidified portion. On a section of the recessed portion observed when the recessed portion is cut along a reference plane parallel to the withdrawal direction, the inner wall surface shows a first contour and a second contour each extending along the withdrawal direction. The first contour and the second contour are each constituted by a curved line. On the section, when (i) a direction perpendicular to the withdrawal direction is defined as a width direction, (ii) a most downstream position of the first contour in the withdrawal direction is defined as a first end point, (iii) a most downstream position of the second contour in the withdrawal direction is defined as a second end point, (iv) a most upstream position of the first contour in the withdrawal direction is defined as a first start point, and (v) a most upstream position of the second contour in the withdrawal direction is defined as a second start point, the first contour is connected to the second contour at a most upstream position of the recessed portion in the withdrawal direction so that the first start point coincides with the second start point on the section, a curved line formed by the first contour and the second contour has a cusp at the position of the first start point and the second start point, a distance between the first contour and the second contour in the width direction increases continuously from an upstream side to a downstream side of the withdrawal direction, and a shape of the inner wall surface of the recessed portion is determined so that the cast rod can be rotationally displaced clockwise or counterclockwise about an axis perpendicular to the section and passing through the first end point or the second end point.

Advantageous Effects of Invention

In the above mold, the shape of the inner wall surface of the recessed portion is determined so that the solidified portion (the tip of the cast rod) can be rotationally displaced about the axis that is perpendicular to the section of the recessed portion observed when the recessed portion is cut along the reference plane parallel to the withdrawal direction and that passes through the first end point or the second end point. That is, a stress generated when the volume of the material changes can be released by converting the stress into the torque of the cast rod. Therefore, the stress and the frictional resistance accompanying generation of the stress can be reduced, and consequently failure of withdrawal of the cast rod and breakout thereof can be prevented.

BRIEF DESCRIPTION OF DRAWINGS

FIG. 13A is a plan view of a mold of Comparative Example 1.

FIG. 13B is a plan view of a mold of Example 1.
FIG. 13C is a plan view of a mold of Example 2.
FIG. 13D is a plan view of a mold of Example 3.
FIG. 13E is a plan view of a mold of Comparative Example 2.
FIG. 13F is a plan view of a mold of Example 4.
FIG. 13G is a plan view of a mold of Example 5.
FIG. 13H is a plan view of a mold of Example 6.
FIG. 13I is a plan view of a mold of Example 7.

DESCRIPTION OF EMBODIMENTS

Figure 1:
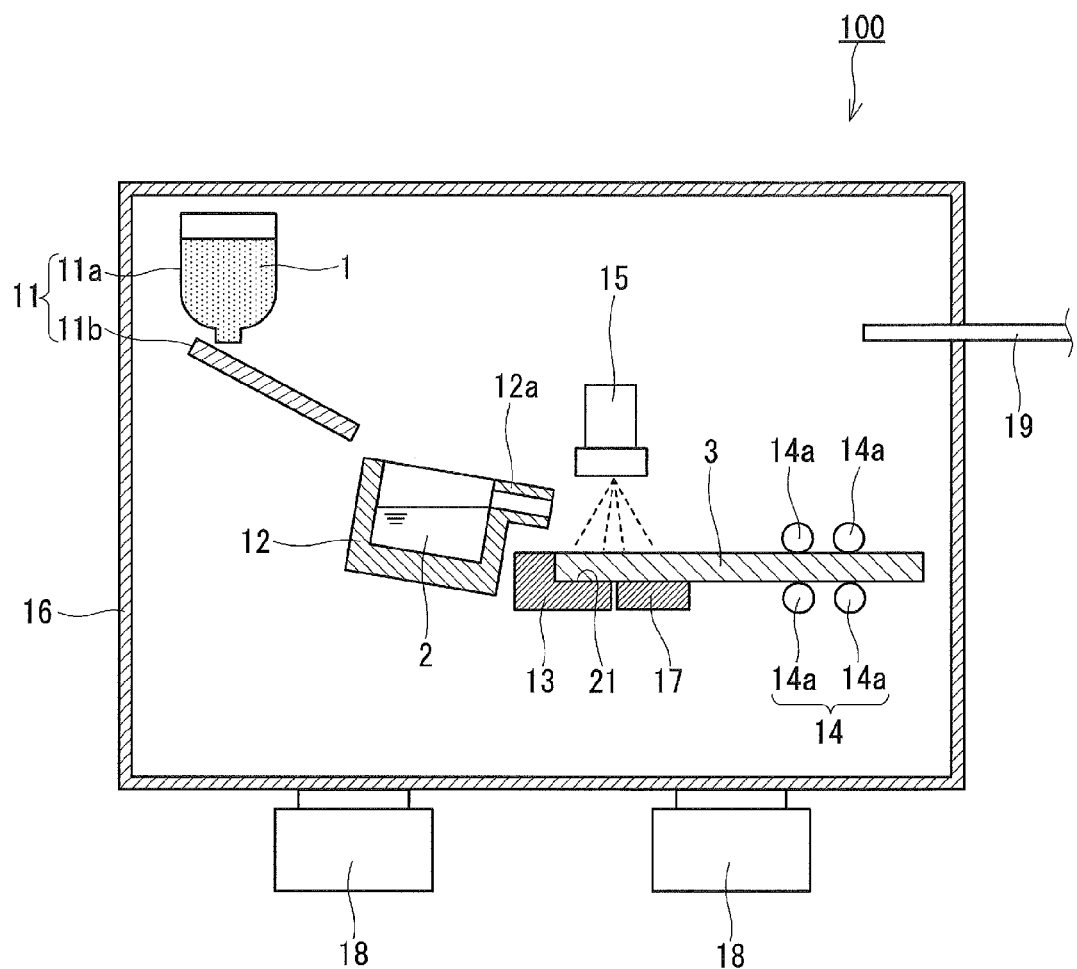
FIG. 1 is a schematic diagram of a casting apparatus according to a first embodiment of the present invention.

A first aspect of the present disclosure provides a mold for producing a cast rod of a material by feeding a melt of the material to the mold and while solidifying the fed material therein, withdrawing a solidified portion of the material. This mold includes a recessed portion for receiving the melt. In this mold, the recessed portion is constituted by an inner wall surface for converting the melt into the solidified portion when the inner wall surface contacts the melt, and opens in a withdrawal direction of the solidified portion. On a section of the recessed portion observed when the recessed portion is cut along a reference plane parallel to the withdrawal direction, the inner wall surface shows a first contour and a second contour each extending along the withdrawal direction. The first contour and the second contour are each constituted by a curved line. On the section, when (i) a direction perpendicular to the withdrawal direction is defined as a width direction, (ii) a most downstream position of the first contour in the withdrawal direction is defined as a first end point, (iii) a most downstream position of the second contour in the withdrawal direction is defined as a second end point, (iv) a most upstream position of the first contour in the withdrawal direction is defined as a first start point, and (v) a most upstream position of the second contour in the withdrawal direction is defined as a second start point, the first contour is connected to the second contour at a most upstream position of the recessed portion in the withdrawal direction so that the first start point coincides with the second start point on the section, a curved line formed by the first contour and the second contour has a cusp at the position of the first start point and the second start point, a distance between the first contour and the second contour in the width direction increases continuously from an upstream side to a downstream side of the withdrawal direction, and a shape of the inner wall surface of the recessed portion is determined so that the cast rod can be rotationally displaced clockwise or counterclockwise about an axis perpendicular to the section and passing through the first end point or the second end point.

A second aspect of the present disclosure provides a mold for producing a cast rod of a material by feeding a melt of the material to the mold and while solidifying the fed material therein, withdrawing a solidified portion of the material. This mold includes a recessed portion for receiving the melt. In this mold, the recessed portion is constituted by an inner wall surface for converting the melt into the solidified portion when the inner wall surface contacts the melt, and opens in a withdrawal direction of the solidified portion. On a section of the recessed portion observed when the recessed portion is cut along a reference plane parallel to the withdrawal direction, the inner wall surface shows a first contour and a second contour each extending along the withdrawal direction. The first contour and the second contour are each constituted by a curved line. On the section, when (i) a direction perpendicular to the withdrawal direction is defined as a width direction, (ii) a most downstream position of the first contour in the withdrawal direction is defined as a first end point, (iii) a most downstream position of the second contour in the withdrawal direction is defined as a second end point, (iv) a most upstream position of the first contour in the withdrawal direction is defined as a first start point, and (v) a most upstream position of the second contour in the withdrawal direction is defined as a second start point, the first contour is connected to the second contour at a most upstream position of the recessed portion in the withdrawal direction so that the first start point coincides with the second start point on the section, a curved line formed by the first contour and the second contour has a cusp at the position of the first start point and the second start point, a distance between the first contour and the second contour in the width direction increases continuously from an upstream side to a downstream side of the withdrawal direction, and when a virtual circle centered at the first end point or the second end point and passing through an arbitrary point on the first contour or the second contour is drawn on the section, the virtual circle intersects the first contour or the second contour only at the arbitrary point, or the virtual circle overlaps the first contour or the second contour.

According to the second aspect, the cast rod can rotate about the first end point or the second end point without interfering with the mold. As a result, the cast rod can be withdrawn smoothly from the mold.

A third aspect provides, in addition to the first aspect, a mold in which when a virtual circle centered at the first end point or the second end point and passing through an arbitrary point on the first contour or the second contour is drawn on the section, the virtual circle may intersect the first contour or the second contour only at the arbitrary point, or the virtual circle may overlap the first contour or the second contour. According to the third aspect, the cast rod can be withdrawn smoothly for the same reason as in the second aspect.

A fourth aspect provides, in addition to any one of the first to third aspects, a mold in which the first contour and the second contour may each be constituted by a circular arc or a part of an ellipse. According to the fourth aspect, the first inner wall surface and the second inner wall surface can be constituted by a part of the outer peripheral surface of a circular cylinder or an elliptical cylinder. In this case, it is easy to design the mold.

A fifth aspect provides, in addition to any one of the first to fourth aspects, a mold in which there may be a symmetry plane that divides a space occupied by the recessed portion into two symmetrical parts. The reference plane may be a plane perpendicular to the symmetry plane and parallel to the withdrawal direction. The first contour and the second contour may each be constituted by a circular arc, and the circular arcs are symmetrical to each other with respect to the symmetry plane. On the reference plane, when (a) an intersection point of the first contour and the symmetry plane is defined as a first intersection point, (b) a straight line connecting the first intersection point and a center of the circular arc that constitutes the first contour is defined as a start reference line, and (c) an angle formed by the symmetry plane and the start reference line is defined as a start angle $\theta 2$, the start angle $\theta 2$ may be in a range of more than 0 degrees and 30 degrees or less. When the start angle $\theta 2$ is in an appropriate range, the cast rod can be withdrawn more smoothly from the mold.

A sixth aspect provides, in addition to the fifth aspect, a mold in which the start angle $\theta 2$ may be in a range of 3 degrees or more and 30 degrees or less. When the start angle $\theta 2$ is in an appropriate range, the cast rod can be withdrawn more smoothly from the mold.

A seventh aspect provides, in addition to any one of the first to sixth aspects, a mold for horizontal continuous casting. The withdrawal direction and the reference plane may each be parallel to a horizontal direction. The mold according to the present disclosure is suitable for horizontal continuous casting.

A eighth aspect provides, in addition to any one of the first to seventh aspects, a mold in which a top of the recessed portion may be opened so that the melt can be fed to the recessed portion by dropping the melt thereinto. The inner wall surface may be constituted by a first inner wall surface from which the first contour is derived, a second inner wall surface from which the second contour is derived, and a bottom surface adjacent to both the first inner wall surface and the second inner wall surface. When the top of the recessed portion is opened, a stress generated in the cast rod can be relieved efficiently.

A ninth aspect of the present disclosure provides a mold for producing a cast rod of a material by feeding a melt of the material to the mold and while solidifying the fed material therein, withdrawing a solidified portion of the material. This mold includes: a recessed portion for receiving the melt; and a nozzle hole that serves as a port for feeding the melt to the recessed portion and allows a most upstream part of the recessed portion in a withdrawal direction of the solidified portion to communicate with an outside of the mold. In this mold, the recessed portion is constituted by an inner wall surface for converting the melt into the solidified portion when the inner wall surface contacts the melt, and opens in the withdrawal direction. On a section of the recessed portion observed when the recessed portion is cut along a reference plane parallel to the withdrawal direction, the inner wall surface shows a first contour and a second contour each extending along the withdrawal direction from an end of the nozzle hole, there is a symmetry plane that divides a space occupied by the recessed portion into two symmetrical parts, and the first contour and the second contour are each constituted by a circular arc or a part of an ellipse, and are symmetrical with respect to the symmetry plane. On the section, when (i) a direction perpendicular to the withdrawal direction is defined as a width direction, (ii) a most downstream position of the first contour in the withdrawal direction is defined as a first end point, (iii) a most downstream position of the second contour in the withdrawal direction is defined as a second end point, and (iv) an intersection point of the symmetry plane and two virtual lines obtained by virtually extending the first contour and the second contour to an upstream side of the withdrawal direction along the ellipse or the circular arc is defined as a virtual start point, a curved line formed by the two virtual lines has a cusp at the virtual start point, a distance between the first contour and the second contour in the width direction increases continuously from the upstream side to a downstream side of the withdrawal direction, and a shape of the inner wall surface of the recessed portion is determined so that the cast rod can be rotationally displaced clockwise or conterclockwise about an axis perpendicular to the section and passing through the first end point or the second end point.

According to the ninth aspect, the cast rod can be withdrawn smoothly from the mold for the same reason as in the first aspect.

A tenth aspect of the present disclosure provides a mold for producing a cast rod of a material by feeding a melt of the material to the mold and while solidifying the fed material therein, withdrawing a solidified portion of the material. This mold includes a recessed portion for receiving the melt. In this mold, the recessed portion is constituted by an inner wall surface for converting the melt into the solidified portion when the inner wall surface contacts the melt, and opens in a withdrawal direction of the solidified portion. On a section of the recessed portion observed when the recessed portion is cut along a reference plane parallel to the withdrawal direction, the inner wall surface shows a first contour and a second contour each extending along the withdrawal direction, and the first contour and the second contour are each constituted by a plurality of line segments. On the section, when (i) a direction perpendicular to the withdrawal direction is defined as a width direction, (ii) a most downstream position of the first contour in the withdrawal direction is defined as a first end point, and (iii) a most downstream position of the second contour in the withdrawal direction is defined as a second end point, a distance between the first contour and the second contour in the width direction increases continuously from an upstream side to a downstream side of the withdrawal direction, and a shape of the inner wall surface of the recessed portion is determined so that the cast rod can be rotationally displaced clockwise or conterclockwise about an axis perpendicular to the section and passing through the first end point or the second end point.

According to the tenth aspect, the cast rod can be withdrawn smoothly from the mold for the same reason as in the first aspect.

An eleventh aspect of the present disclosure provides a casting apparatus including: a crucible for holding a melt of a material; the mold according to any one of the first to tenth aspects, for receiving the melt from the crucible and solidifying the material; and a conveyor for withdrawing a solidified portion of the material from the mold so as to produce a cast rod of the material.

A twelfth aspect provides, in addition to the eleventh aspect, a casting apparatus which may further include: a material feeder for feeding the material to the crucible; and a heater for adjusting a solidification rate of the material in the mold.

A thirteenth aspect provides, in addition to the eleventh or twelfth aspect, a mold for horizontal continuous casting. A top of the recessed portion of the mold may be opened so that the melt can be fed from the crucible to the recessed portion by dropping the melt thereinto.

A fourteenth aspect of the present disclosure provides a casting apparatus including: a crucible for holding a melt of a material; the mold according to the ninth aspect, for receiving the melt from the crucible and solidifying the material; and a conveyor for withdrawing a solidified portion of the material from the mold so as to produce a cast rod of the material. In this apparatus, the crucible is connected to the nozzle hole of the mold so that the melt can be fed from the crucible to the recessed portion of the mold.

A fifteenth aspect of the present disclosure provides a method for producing a cast rod, including the steps of: feeding a melt of a material to the mold according to any one of the first to tenth aspects; and while solidifying the material in the mold, withdrawing a solidified portion of the material so as to produce a cast rod of the material.

A sixteenth aspect provides, in addition to the fifteenth aspect, a method for producing a cast rod, in which the mold may be a mold for horizontal continuous casting. A top of the recessed portion of the mold may be opened. In the feeding step, the melt may be fed from a crucible to the recessed portion by dropping the melt thereinto.

A seventeenth aspect of the present disclosure provides a method for producing a cast rod, including the steps of: feeding a melt of a material to the mold according to the ninth aspect; and while solidifying the material in the mold, withdrawing a solidified portion of the material so as to produce a cast rod of the material. In the feeding step, the melt is fed from a crucible to the recessed portion of the mold through the nozzle hole.

According to the eleventh to seventeenth aspects, the cast rod can be produced efficiently.

A eighteenth aspect provides, in addition to any one of the fifteenth to seventeenth aspects, a method for producing a cast rod, in which the material may be a material that undergoes volumetric expansion when the material changes from a liquid phase to a solid phase. The mold provided by the present disclosure is suitable for casting these materials.

A nineteenth aspect provides, in addition to the eighteenth aspect, a method of producing a cast rod, in which the material may be silicon or a silicon compound. The mold provided by the present disclosure is suitable for casting these materials.

Hereinafter, the embodiments of the present invention will be described with reference to the accompanying drawings. The present invention is not limited to the following embodiments. In this description, specific numerical values and specific materials are given as examples, and should not be seen as to limit the scope of the present invention.

First Embodiment

As shown in FIG. 1, a casting apparatus 100 according to the present embodiment includes a material feeder 11, a crucible 12, a mold 13, a conveyor 14, a heater 15, and a chamber 16. These components are disposed in the chamber 16. Some of these components may be located outside the chamber 16. FIG. 1 shows how a cast rod 3 is produced. A melt 2 of a material 1 is fed to the mold 13. While the fed material 1 is being solidified in the mold 13, a solidified portion of the material 1 (the tip of a cast rod 3) is withdrawn. Thus, the cast rod 3 is produced continuously. As the material 1, a material that undergoes volumetric expansion when it changes from the liquid phase to the solid phase can be used. Specifically, silicon or a silicon compound can be used as the material 1.

The casting apparatus 100 is configured as a so-called horizontal continuous casting apparatus. Therefore, the mold 13 is a mold for horizontal continuous casting, and the cast rod 3 is withdrawn in the horizontal direction.

A vacuum pumps 18 and a gas inlet 19 are connected to the chamber 16. The vacuum pumps 18 and the gas inlet 19 can be used to prevent oxidation of the material 1 during melting thereof. The inside of the chamber 16 can be maintained at a pressure lower than atmospheric pressure (i.e., in a vacuum state) during operation of the vacuum pumps 18. The air in the chamber 16 can be replaced by a desired gas by introducing the gas into the chamber 16 through the gas inlet 19. For example, an inert gas such as argon, a reducing gas such as hydrogen, or a mixture of these gasses can be used. The pressure and atmosphere for the production of the cast rod 3 are not particularly limited, of course. The cast rod 3 can also be produced under atmospheric conditions in some cases.

The material feeder 11 includes a material reservoir 11a and a slide 11b, and serves to feed the material 1 into the crucible 2. The material 1 is stored in the solid state in the material reservoir 11a. The material 1, which has not yet fed into the crucible 12, is typically in particulate or bulk form. The material 1 is transferred from the material reservoir 11a to the slide 11b, and then to the crucible 12 through the slide 11b. The method for feeding the material 1 to the crucible 12 is not particularly limited. That is, any type of feeder, such as a parts feeder type, basket type, push rod type, inclined slider type, or belt conveyor type feeder, can be used. When it is difficult to hold the material 1 in the chamber 16, a part of the material feeder 11, for example, the material reservoir 11a, may be disposed outside the chamber 16 so as to feed the material 1 to the crucible 12 from the outside of the chamber 16.

The material 1 may be fed continuously from the material feeder 11 to the crucible 12, or may be fed intermittently. The feed rate of the material 1 is, for example, in the range of 0.1 g/sec to 20 g/sec. The following advantages are obtained by adjusting the feed rate appropriately. The material 1 is less likely to evaporate during melting, resulting in a high rate of utilization of the material 1. In addition, the melting and casting of the material 1 can avoid involving significant energy transfer. Therefore, an increase in the size of the casting apparatus 100 can be prevented, which in turn prevents an increase in the production cost. Of course, the feed rate of the material 1 is not particularly limited because it depends on the size of the cast rod 3, etc.

The material feeder 11 may have a pretreatment unit for pretreating the material 1. The pretreatment unit is, for example, a dryer for drying the material 1 or a crusher for crushing the material 1 into pieces of an appropriate size.

The crucible 12 serves to form and hold the melt 2 of the material 1. The material 1 is fed from the material feeder 11 to the crucible 12, and heated and melted in the crucible 12. The heating method for melting the material 1 in the crucible 12 is not particularly limited. Various heating methods such as resistance heating, induction heating, arc discharge heating, and electron beam irradiation heating can be used. The material of the crucible 12 also is not particularly limited. The crucible 12 is typically made of graphite. A refractory material also may be used as the material of the crucible 12 if the oxidation of the material 1 is insignificant.

The crucible 12 is provided with a nozzle 12a for feeding the melt 2 to the mold 13. The melt 2 is dropped into the mold 13 through the nozzle 12a. The melt 2 may be dropped into the mold 13 through a groove formed on the outer wall of the crucible 12, or may be dropped into the mold 13 through a hole formed in the bottom of the crucible 12.

The crucible 12 has a capacity large enough to hold an appropriate amount of the melt 2. For example, when the material 1 is fed continuously from the material feeder 11 to the crucible 12, the crucible 12 has, for example, a capacity large enough to allow continuous feeding for 10 to 600 seconds. When the material 1 is fed to the crucible 12 at 1 g/sec, the crucible 12 has a capacity large enough to hold 10 to 600 g of the material 1. The crucible 12 with an appropriate capacity brings the following advantages. The possibility that the unmelted material 1 may be drained into the mold 13 can be reduced. Gas components and low-boiling impurities contained in the material 1 can be sufficiently removed in the crucible 12, and thus air bubbles are less likely to enter the cast rod 3. The material 1 is less likely to evaporate during melting, resulting in a high rate of utilization of the material 1. Electricity consumed by the melting also can be reduced.

A plurality of crucibles 12 may be provided in parallel or in series in order to achieve additional objectives such as prevention of drainage of the unmelted material 1, degassing of the material 1, and stabilization of the feed rate of the melt 2 into the mold 13.

In this description, the term "crucible" has a broad meaning including a "tundish" used in the field of casting.

The mold 13 serves to receive the melt 2 from the crucible 12 and solidify it so as to obtain the cast rod 3. The mold 13 is typically made of a metallic material or graphite. As a metallic material, a metal such as copper, aluminum, iron, tungsten or molybdenum can be used. The mold 13 may have a surface coated with a low friction material such as amorphous carbon in order to reduce the frictional resistance.

The casting apparatus 100 may be provided with a cooling system for cooling the mold 13. For example, when a flow passage is formed in the mold 13, a coolant is passed through the flow passage to cool the mold 13 efficiently. Examples of liquid coolants include water and oil. Examples of gas coolants include air. The flow passage for the flow of the coolant may be provided along the outer peripheral surface of the mold 13. Furthermore, it is also possible to cool the mold 13 by spraying a cooling gas to the mold 13.

The dimensions of the exit of the mold 13, i.e., the dimensions (the width and height) of the cast rod 3 to be produced in the mold 13 are, for example, in the range of 30 to 150 mm. The length of the cast rod 3 can be determined arbitrarily according to the distance of withdrawal of the cast rod 3 from the mold 13. The cast rod 3 having these dimensions can be produced relatively easily using the mold 13 for the following reasons. That is, when the melt 2 is dropped from the crucible 12 into the mold 13, high positional accuracy is not required. In addition, the dropped melt 2 is more likely to be filled uniformly in the mold 13.

A support 17 is provided downstream of the mold 13. The support 17 serves to support the cast rod 3 withdrawn from the mold 13 and to guide the cast rod 3 in a predetermined withdrawal direction. The support 17 may be configured to support the side surfaces as well as the bottom surface of the cast rod 3, or may be configured to support the side surfaces of the cast rod 3 instead of the bottom surface thereof.

The heater 15 is provided above the mold 13, and serves to adjust the solidification rate of the material 1 in the mold 13. The melt 2 is heated directly by the heater 15 or indirectly thereby through the mold 13, so that the solidification rate and solidification position are adjusted. As the heater 15, a heater employing a heating method, such as resistance heating, induction heating, arc discharge heating or electron beam irradiation heating, can be used.

The conveyor 14 serves to withdraw the solidified portion of the material 1 from the mold 13 so that the cast rod 3 of the material 1 is produced continuously. In the present embodiment, the conveyor 14 is composed of a plurality of rollers 14a capable of supporting the cast rod 3. The cast rod 3 placed between the rollers 14a can be conveyed by rotating the rollers 14a. Of course, the structure of the conveyor 14 is not particularly limited. The conveyor 14 may include a holder for fixing the cast rod 3 and be configured to convey the cast rod 3 by moving the holder in the withdrawal direction.

A part of the conveyor 14 may extend outside the chamber 16. In this case, the cast rod 3 can easily be conveyed outside the chamber 16. The conveyor 14 may have a cutter for cutting the cast rod 3 into pieces of a desired length. The cast rod 3 may be cut either inside or outside the chamber 16. Furthermore, if the casting apparatus 100 is connected to another apparatus that requires the cast rod 3, for example, the film forming apparatus described in Patent Literature 5 (JP 4331791B2), the cast rod 3 can be fed continuously to that film forming apparatus.

Next, the structure of the mold 13 is described in detail.

Figure 2A:
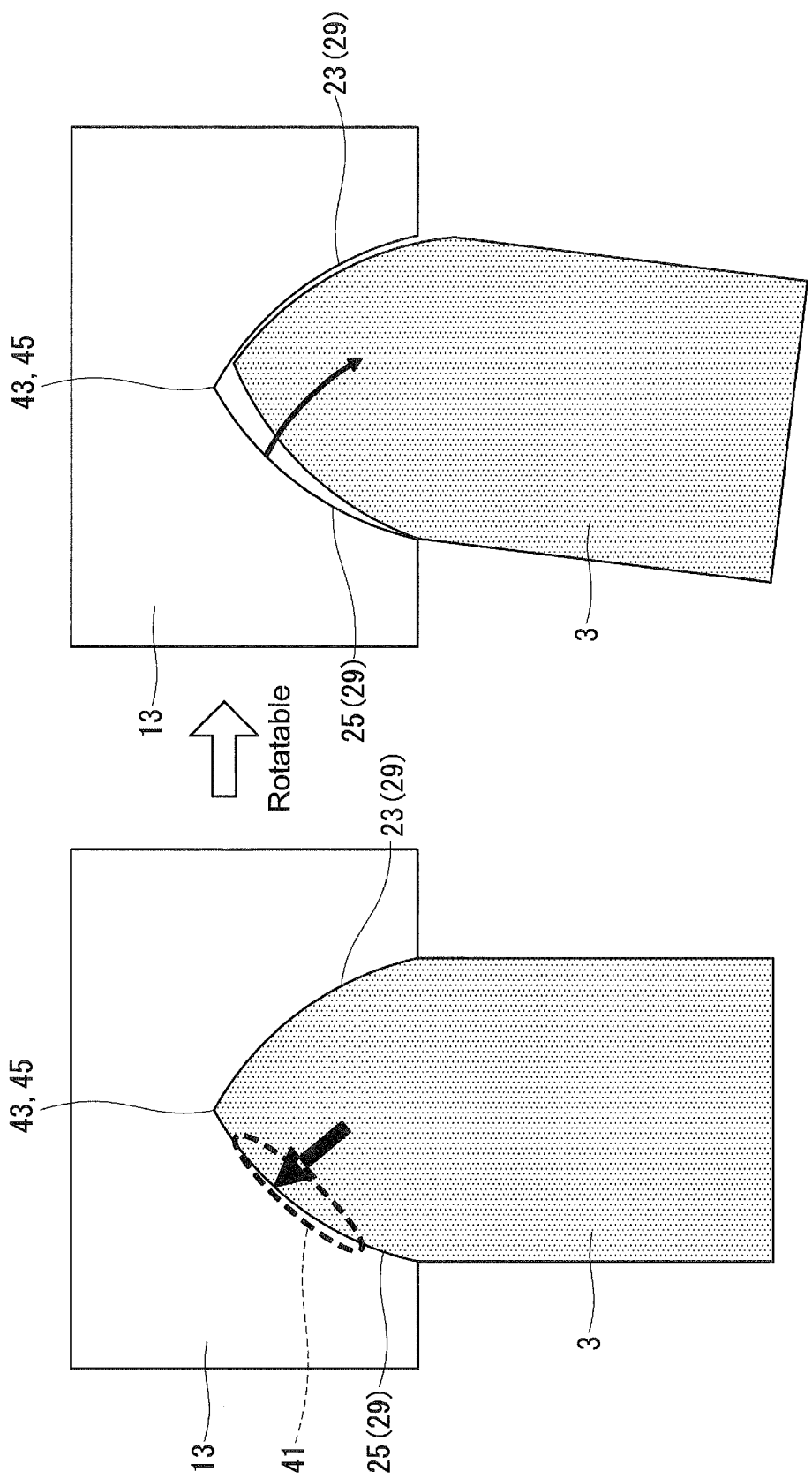
FIG. 2A is a diagram illustrating the action of a mold according to the first embodiment.

In the case where the material 1 has the property of expanding during solidification, the volume of the material 1 increases in the mold 13 as it solidifies. Then, as shown in FIG. 2A, a compressive stress (thick arrow) is generated in a region 41 near the boundary between the cast rod 3 and the mold 13. The mold 13 of the present embodiment is configured to relieve this compressive stress by allowing the rotational displacement of the cast rod 3. Furthermore, even if the withdrawal direction of the cast rod 3 is shifted from the design direction by vibration and a stress is generated in the cast rod 3, the stress can be relieved by the rotation of the cast rod 3.

Figure 2B:
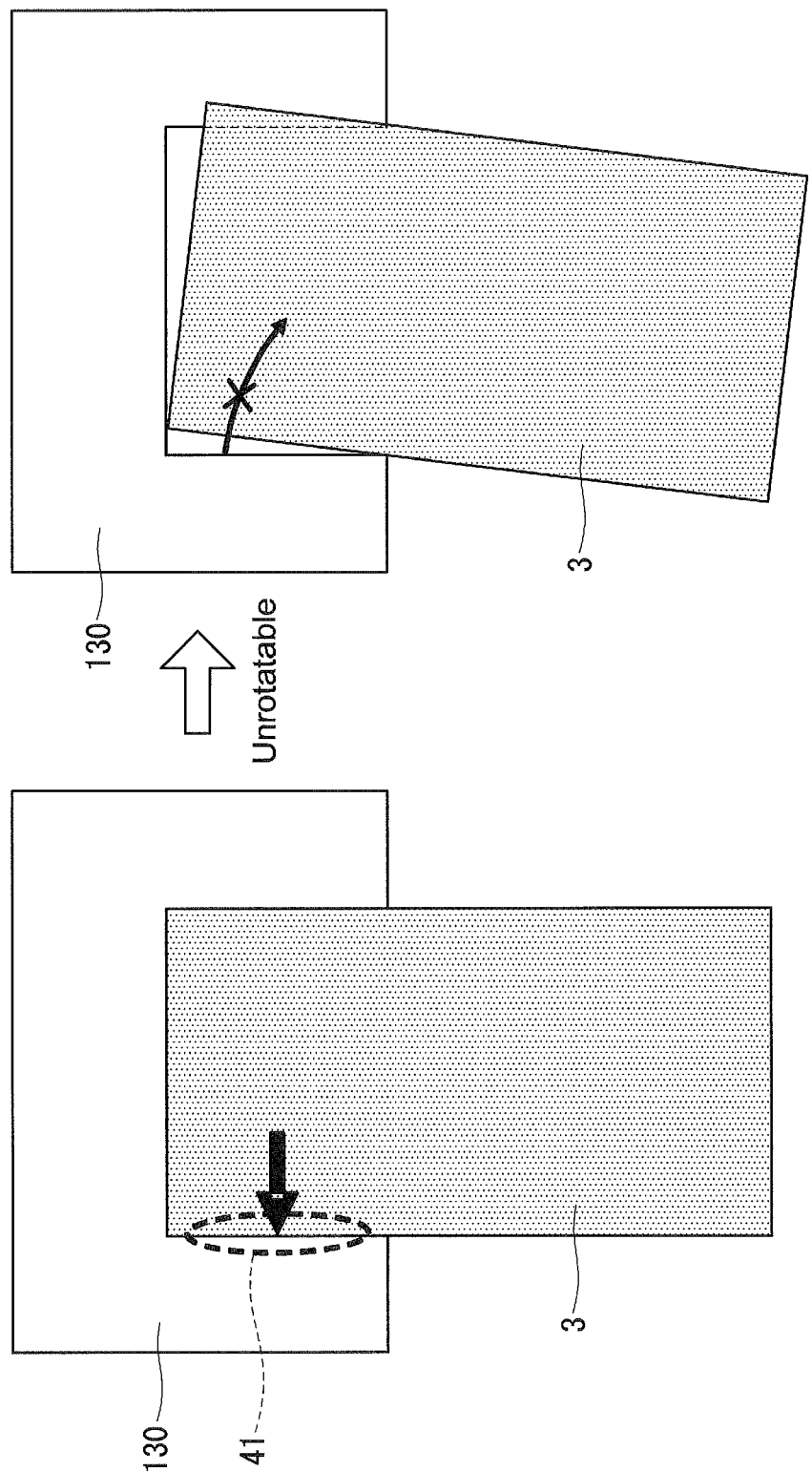
FIG. 2B is a diagram illustrating the action of a conventional mold.

On the other hand, in the case of a mold 130 shown in FIG. 2B, when the cast rod 3 is tried to rotate, interference with the mold 130 occurs. Therefore, the rotational displacement of the cast rod 3 is not allowed and thus the compressive stress (thick arrow) cannot be relieved. In this case, the cast rod 3 is pressed against the mold 130 and cannot be withdrawn therefrom, or the cast rod 3 is subjected to the compressive stress and thus a breakout occurs.

Figure 3:
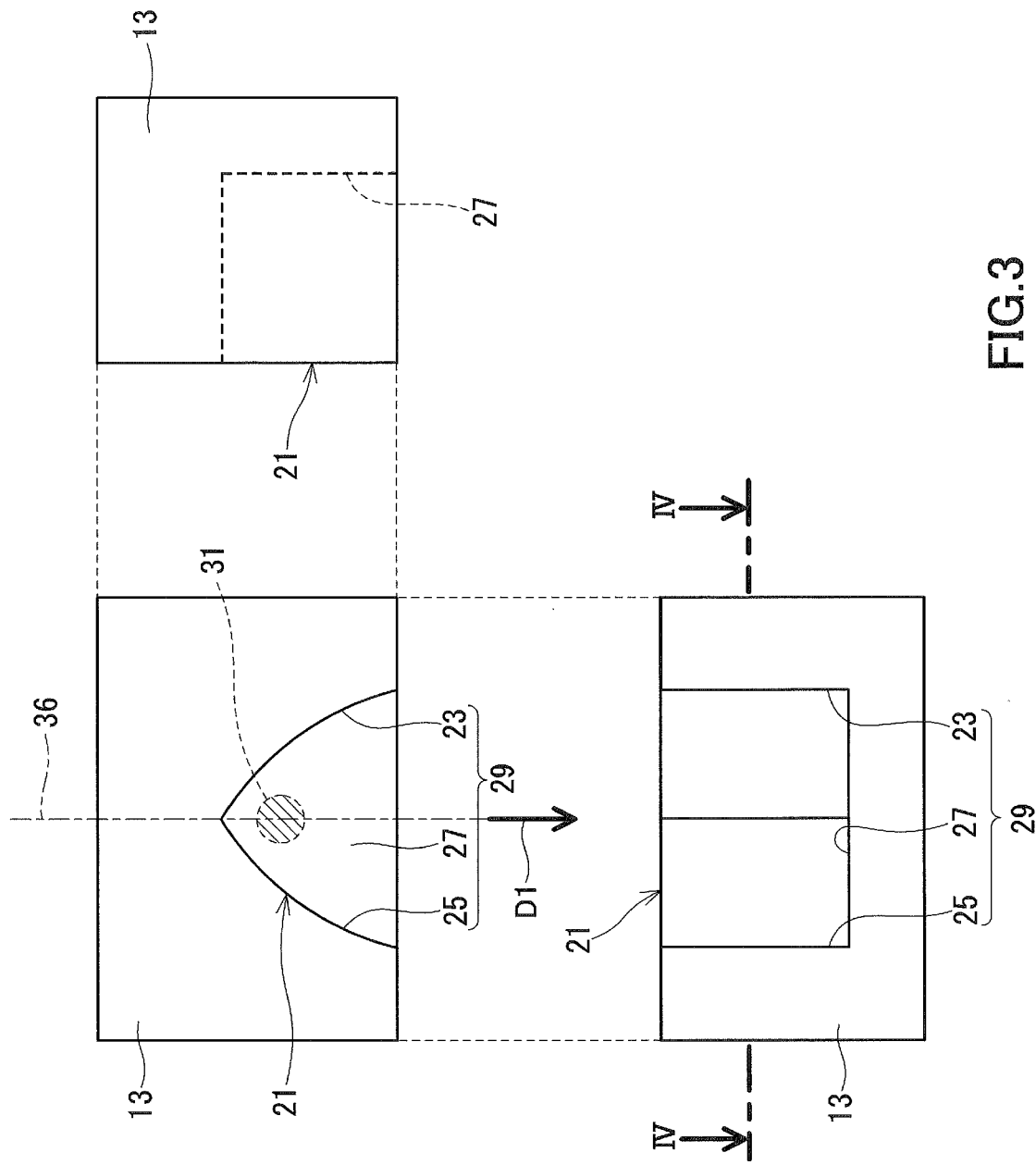
FIG. 3 is a three-view drawing of the mold according to the present embodiment.

FIG. 3 is a three-view drawing of the mold 13. The mold 13 has a recessed portion 21 for receiving the melt 2. The recessed portion 21 is constituted by the inner wall surface 29 and opens in the withdrawal direction D1 of the cast rod 3. The top of the recessed portion 21 is opened so that the melt 2 can be fed to the recessed portion 21 by dropping the melt 2 thereinto. The inner wall surface 29 is a surface for converting the melt 2 into a solidified portion when it contacts the melt 2, and includes a right inner wall surface 23 (first inner wall surface), a left inner wall surface 25 (second inner wall surface), and a bottom surface 27. There is a ridge at the boundary between the right inner wall surface 23 and the bottom surface 27. There is a ridge also at the boundary between the left inner wall surface 25 and the bottom surface 27. There is a ridge also at the boundary between the right inner wall surface 23 and the left inner wall surface 25. In the present embodiment, the mold 13 has a rectangular shape in plan view, but the general shape of the mold 13 is not particularly limited.

In the mold 13 of the present embodiment, there is a symmetry plane 36 that divides the space occupied by the recessed portion 21 into two symmetrical parts. Therefore, the right inner wall surface 23 and the left inner wall surface 25 are substantially mirror symmetrical with respect to the symmetry plane 36. The ridge formed by the right inner wall surface 23 and the left inner wall surface 25 is on the symmetry plane 36. The central axis of the cast rod 3 is on the symmetry plane 36. The recessed portion 21 having a symmetrical structure makes it easier to fill the melt 2 uniformly in the mold 13, and thus makes it possible to solidify the material 1 uniformly. In the case where the cast rod 3 has a rectangular rod shape, its central axis passes through the intersection point of the diagonal lines of the rectangular cross section of the cast rod 3. In the case where the cast rod 2 has a circular cylindrical shape, its central axis passes through the center of the circular cylinder.

The melt 2 is dropped into a shaded region 31 surrounded by the right inner wall surface 23 and the left inner wall surface 25 and releases its heat to the mold 13. Basically, the material 1 solidifies before it reaches the open end of the recessed portion 21. In order to increase the accuracy of the shape and dimensions of the cast rod 3, an auxiliary mold may be provided downstream of the mold 13 to shape the surface of the cast rod 3 additionally. In this case, the solidification of the material 1 need not be completed in the mold 13.

Figure 4:
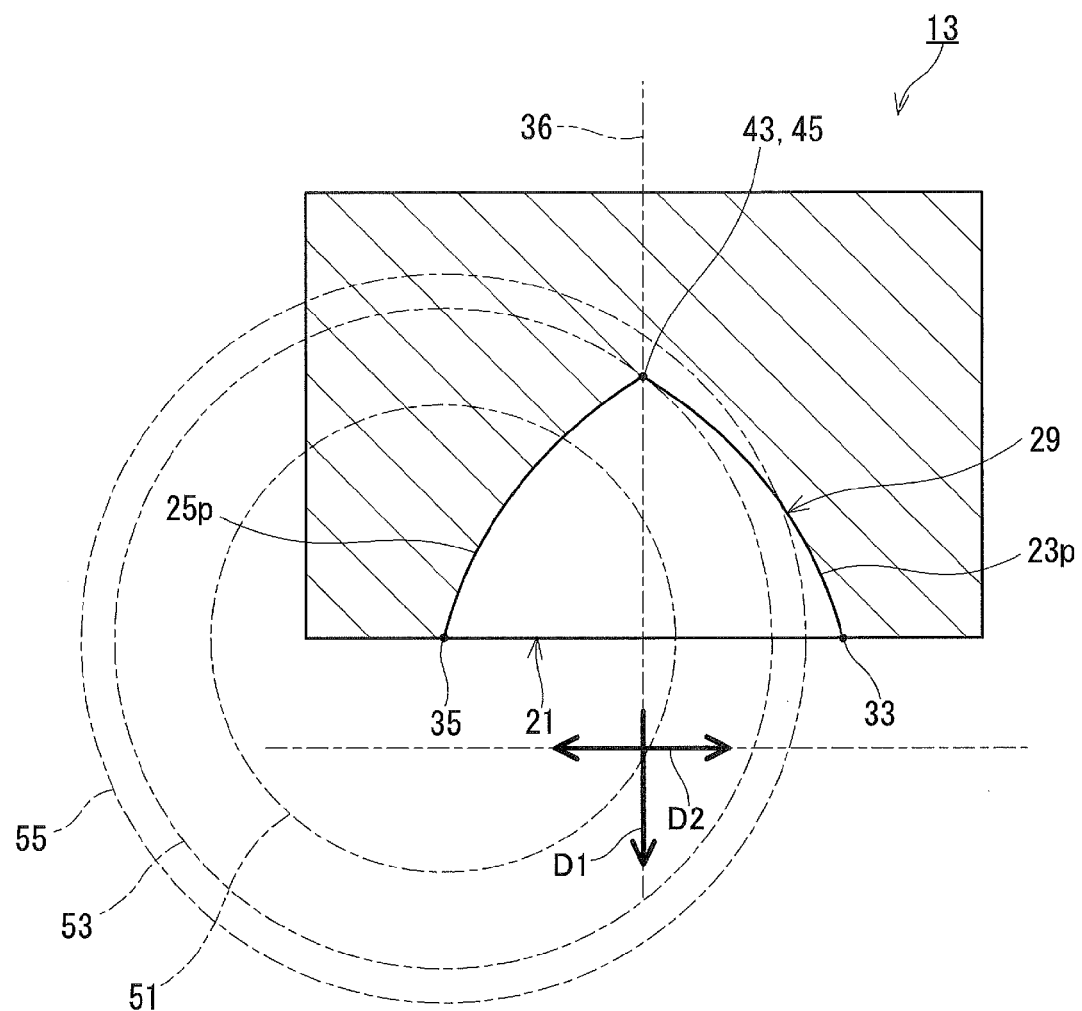
FIG. 4 is a horizontal sectional view of the mold according to the present embodiment, taken along the line IV-IV.

FIG. 4 shows a section of the mold 13 taken along the line IV-IV, i.e., a section of the mold 13 observed when the recessed portion 21 is cut along a reference plane parallel to the withdrawal direction D1. The reference plane is a plane perpendicular to the symmetry plane 36 and parallel to the withdrawal direction D1. The reference plane is also a plane parallel to the horizontal direction, and the section shown in FIG. 4 is the horizontal section of the mold 13. Furthermore, the central axis of the cast rod 3 coincides with the line of intersection of the reference plane and the symmetry plane 36.

On the section shown in FIG. 4, the inner wall surface 29 shows a right contour 23p (first contour) and a left contour 25p (second contour). The right contour 23p and the left contour 25p each extend along the withdrawal direction D1. On this section, a direction perpendicular to the withdrawal direction D1 is defined as a width direction D2, the most downstream position of the right contour 23p in the withdrawal direction D1 is defined as a right end point 33 (first end point), and the most downstream position of the left contour 25p in the withdrawal direction D1 is defined as a left end point 35 (second end point). Furthermore, the most upstream position of the right contour 23p in the withdrawal direction D1 is defined as a right start point 43 (first start point) and the most upstream position of the left contour 25p in the withdrawal direction D1 is defined as a left start point 45 (second start point).

In the present embodiment, the right contour 23p and the left contour 25p are each constituted by a curved line. More specifically, the right contour 23p and the left contour 25p are each constituted by a circular arc. In other words, the right inner wall surface 23 from which the right contour 23p is derived is constituted by a part of the outer peripheral surface of a circular cylinder. The left inner wall surface 25 from which the left contour 25p is derived also is constituted by a part of the outer peripheral surface of a circular cylinder. The circular cylinder that forms the right inner wall surface 23 has an outer diameter equal to that of the circular cylinder that forms the left inner wall surface 25. The right contour 23p and the left contour 25p are each constituted by a circular arc, and the circular arcs are symmetrical to each other with respect to the symmetry plane 36. On the section shown in FIG. 4, the right contour 23p is connected to the left contour 25p at the most upstream position of the recessed portion 21 in the withdrawal direction D1 so that the right start point 43 coincides with the left start point 45. A curved line formed by the right contour 23p and the left contour 25p has a cusp at the position of the right start point 43 and the left start point 45. That is, a series of curved lines formed by the right contour 23p and the left contour 25p is non-differentiable at the right start point 43 and the left start point 45. The start points 43 and 45 are on the symmetry plane 36. That is, the cusp is derived from the ridge between the right inner wall surface 23 and the left inner wall surface 25.

The distance between the right contour 23p and the left contour 25p in the width direction D2 increases continuously (and monotonously) from the upstream side to the downstream side of the withdrawal direction D1. The shape of the inner wall surface 29 of the recessed portion 21 is determined so that when the solidified portion occupies the recessed portion 21 to the positions of the right end point 33 and the left end point 35, the solidified portion (cast rod 3) can be rotationally displaced clockwise or counterclockwise about an axis perpendicular to the section of FIG. 4 and passing through the right end point 33 or the left end point 35. More specifically, the rotational displacement of the cast rod 3 is allowed when the following conditions are satisfied.

As shown in FIG. 4, when a virtual circle centered at the right end point 33 or the left end point 35 and passing through an arbitrary point on the right contour 23p or the left contour 25p is drawn on the section shown in FIG. 4, the virtual circle intersects the right contour 23p or the left contour 25p only at that arbitrary point, or the virtual circle overlaps the right contour 23p or the left contour 25p. That is, the virtual circle does not intersect the right contour 23p and the left contour 25p at more than one point.

Three virtual circles 51, 53 and 55 are shown in FIG. 4. These virtual circles 51, 53 and 55 are each drawn with the left end point 35 as the center thereof. The virtual circle 51 intersects the left contour 25p at only one point. The virtual circle 53 intersects the left contour 25p at only one point. The virtual circle 55 intersects the right contour 23p at only one point.

When the cast rod 3 rotates about the left end point 35, points on the outer peripheral surface of the cast rod 3 move along these virtual circles 51, 53 and 55. That is, the cast rod 3 can rotate without interfering with the mold 3. When a stress is generated between the cast rod 3 and the mold 13 by the expansion of the material 1, the stress is applied perpendicular to the right inner wall surface 23 or the left inner wall surface 25. Then, the cast rod 3 rotates about the end point 33 or the end point 35 due to the reaction to the stress, and thus the stress can be relieved (see FIG. 2A). As a result, problems such as failure of withdrawal and breakout can be prevented.

Furthermore, the rotational displacement of the cast rod 3 can also be allowed when the virtual circle centered at the right end point 33 or the left end point 35 overlaps the right contour 23p or the left contour 25p. Therefore, also in this case, the effect due to the relief of the stress can be obtained. However, since the outer peripheral surface of the cast rod 3 slides along the right inner wall surface 23 or the left inner wall surface 25 of the mold 13, such a configuration may have a limited effect compared to the configuration in which the virtual circle intersects the right contour 23p or the left contour 25p at only one point.

The phrase "the cast rod 3 can be rotationally displaced" does not mean that the cast rod 3 is allowed to rotate 360 degrees. For example, the above-described effect can be obtained only by allowing a rotation by a small angle, for example, 0.1 to 0.5 degrees. The movement of the cast rod 3 is basically limited by the conveyor 14, the support 7, etc.

In the present embodiment, the right contour 23p and the left contour 25p are each constituted by a circular arc. However, even if these contours slightly deviate from the circular arc for the reasons of processing and operation, the above-described effect can be obtained.

Next, a more preferred shape of the mold 13 is described. It should be noted that in the following description, the terms "right" and "left" are interchangeable with each other.

Figure 5:
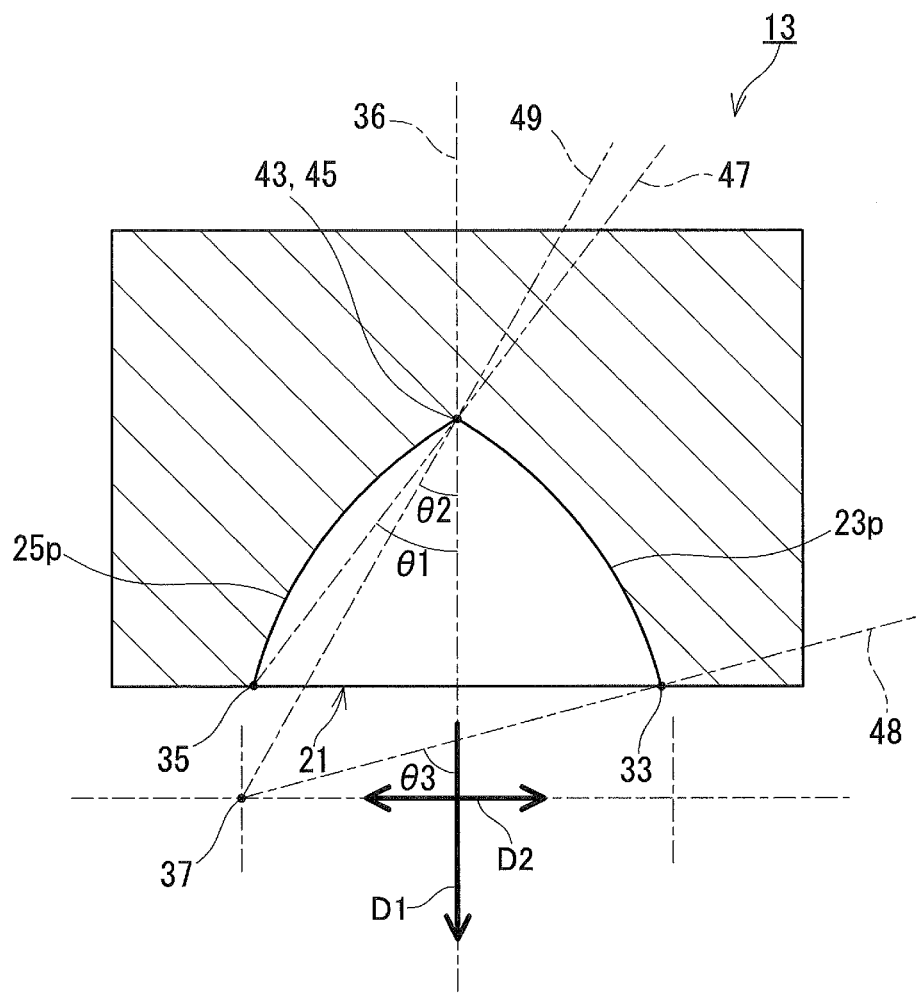
FIG. 5 is a horizontal sectional view similar to FIG. 4.

As shown in FIG. 5, on the reference plane, a straight line connecting the left end point 35 and the right start point 43 is defined as a first reference line 47, an angle formed by the first reference line 47 and the symmetry plane 36 is defined as a first angle $\theta 1$, a straight line connecting the right start point 43 and the center 37 of the circular arc that constitutes the right contour 23p is defined as a second reference line 49 (start reference line), an angle formed by the symmetry plane 36 and the second reference line 49 is defined as a second angle $\theta 2$ (start angle), a straight line connecting the right end point 33 and the center 37 of the circular arc that constitutes the right contour 23p is defined as a third reference line 48 (end reference line), and an angle formed by the third reference line 48 and the symmetry plane 36 is defined as a third angle $\theta 3$ (end angle). The angles $\theta 1$ to $\theta 3$ are the values obtained when the withdrawal direction D1 is a 0-degree axis and the direction opposite to the withdrawal direction D1 is a 180-degree axis.

The right start point 43 is also an intersection point (first intersection point) of the right contour 23p and the symmetry plane 36. In the case where the mold 13 is provided with a nozzle hole as described later, the right contour 23p does not intersect the symmetry plane 36. In this case, the intersection point of the symmetry plane 36 and a virtual line obtained by virtually extending the right contour 23p to the upstream side of the withdrawal direction D1 along the circular arc that constitutes the right contour 23p is defined as a virtual start point, and a straight line connecting the virtual start point and the center 37 of the circular arc is treated as the second reference line 49. The same applies to the case where there is no real intersection point of the left contour 25p and the symmetry plane 36.

When the third angle $\theta 3$ is greater than 90 degrees, the distance from the right end point 33 to the left end point 35 is smaller than the width of the cast rod 3 molded in the mold 13. In this case, it is obvious that the cast rod 3 cannot be withdrawn. Therefore, the third angle $\theta 3$ is 90 degrees or less. The lower limit of the third angle $\theta 3$ is not particularly limited. The third angle $\theta 3$ is, for example, greater than 0 degrees.

Figure 6:
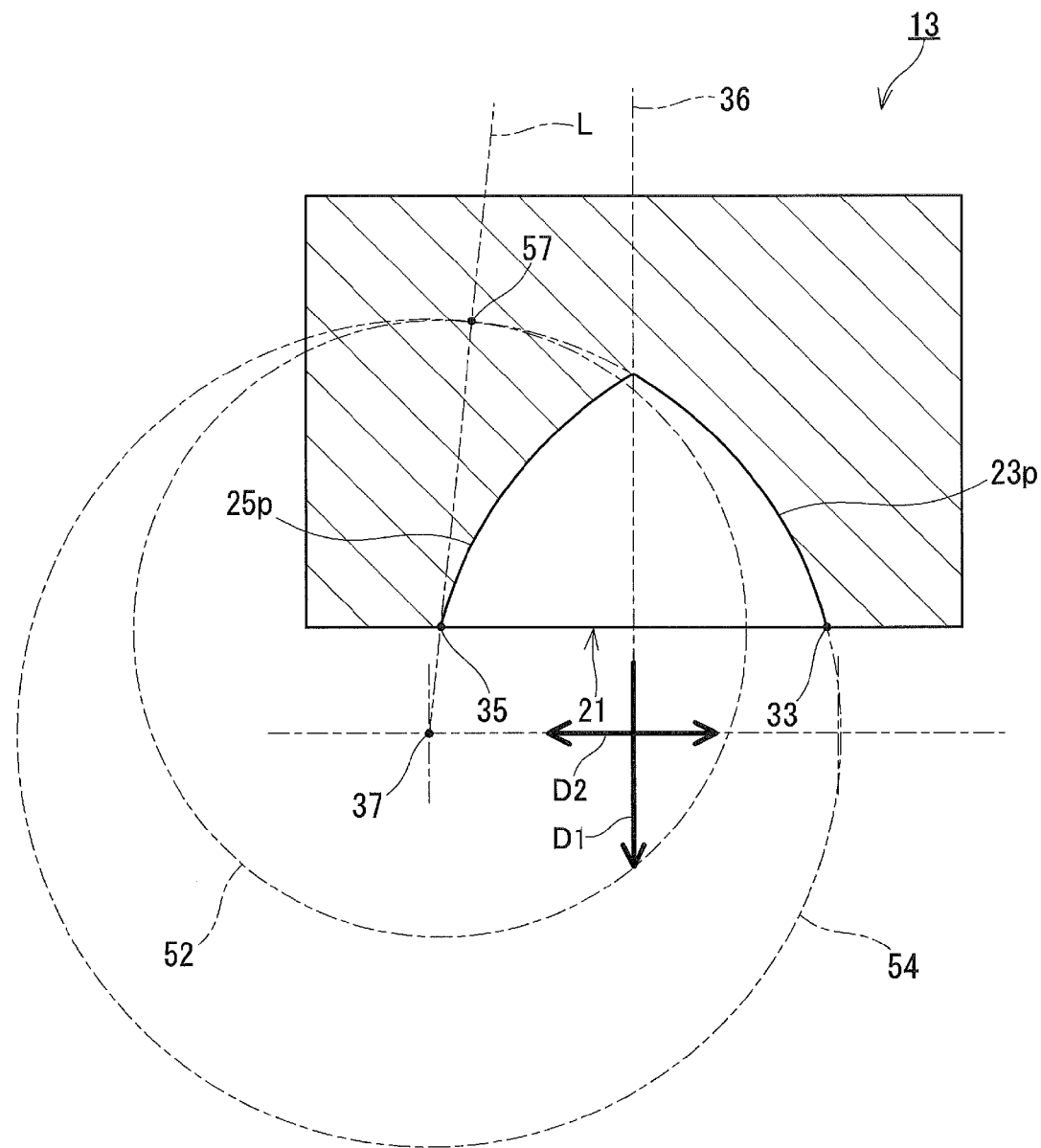
FIG. 6 is a horizontal sectional view similar to FIG. 4.

When the third angle $\theta 3$ is 90 degrees or less, the center 37 of the circular arc is located on a straight line connecting the right end point 33 and the left end point 35 or on the more downstream side of this straight line in the withdrawal direction D1. As shown in FIG. 6, a virtual circle 54 that overlaps the right contour 23p and a virtual circle 52 inscribed in the virtual circle 54 are assumed. The center of the virtual circle 52 coincides with the left end point 35. The point of contact 57 between the virtual circle 52 and the virtual circle 54 is on a straight line L connecting the center 37 of the virtual circle 54 and the left end point 35. The distance between the virtual circle 52 and the virtual circle 54 increases with distance from the straight line L along the circumferential direction.

Furthermore, in the present embodiment, the shape of the recessed portion 21 is determined so that the first angle $\theta 1$ is equal to or greater than the second angle $\theta 2$.

When the first angle $\theta 1$ is equal to or greater than the second angle $\theta 2$ as in the present embodiment, the point of contact 57 shown in FIG. 6 is located outside the recessed portion 21. The distance between the virtual circle 54 and the virtual circle 52 increases with distance from the point of contact 57. As described with reference to FIG. 4, when the cast rod 3 rotates about the left end point 35, a specific point on the outer peripheral surface of the cast rod 3 moves along a virtual circle centered at the left end point 35 (the virtual circles 51, 53 and 55 in FIG. 4 and the virtual circle 52 in FIG. 6). The specific point moves away from the right inner wall surface 23 or the left inner wall surface 25 as the rotational angle of the cast rod 3 increases. Therefore, the rotation of the cast rod 3 is allowed and thus the stress can be relieved by that rotation.

On the other hand, let us consider the case where the first angle $\theta 1$ is smaller than the second angle $\theta 2$. In this case, when the cast rod 3 is tried to rotate, the cast rod 3 is pressed against the right inner wall surface 23 or the left inner wall surface 25 of the mold 13. That is, as described with reference to FIG. 2B, the rotation of the cast rod 3 is not allowed and thus the stress cannot be relieved by that rotation.

The first angle $\theta 1$ is, for example, in a range of 30 to 60 degrees, and the second angle $\theta 2$ is, for example, in a range of more than 0 degrees and 30 degrees or less. When the first angle $\theta 1$ is smaller than 30 degrees, the virtual circles described with reference to FIG. 4 intersect the right contour 23p or the left contour 25p at least two points. In this case, the rotational displacement of the cast rod 3 is not allowed and thus the effect of relieving the stress cannot be obtained. In other words, the distance between the start point 43 (or 45) and the line segment connecting the right end point 33 and the left end point 35 is, for example, not more than $(3/4)^{1/2}$ times the length of the line segment connecting the right end point 33 and the left end point 35. Even if the first angle $\theta 1$ exceeds 60 degrees, the cast rod 3 can be withdrawn. However, if the first angle $\theta 1$ is greater than 60 degrees, the length of the recessed portion 21 in the withdrawal direction D1 is extremely short, which makes it difficult to solidify the material 1 sufficiently in the recessed portion 21.

As shown in FIG. 2A, when the rotation of the cast rod 3 occurs, a tensile stress is applied in a direction perpendicular to the interface between the mold 13 and the cast rod 3 and a shear stress is applied in a direction parallel to the interface. As a result, the cast rod 3 is detached from the mold 13. The more parallel the rotational direction of the cast rod 3 and the tangential direction of the inner wall surface 29 are, the more the shear stress contributes, and the more perpendicular they are, the more the tensile stress contributes. As shown in FIG. 2A, when a stress to rotate the cast rod 3 clockwise is generated, the contribution of the tensile stress is higher on a point on the left inner wall surface 25, while the contribution of the shear stress is higher on a point on the right inner wall surface 23. However, among the points on the inner wall surface 29, the start point 43, 45 is the intersection point of the right inner wall surface 23 and the left inner wall surface 25, and is a singular point. Therefore, the stress is likely to be concentrated on the start point 43, 45, at which the detachment of the cast rod 3 from the mold 13 can start.

On the other hand, the point at which the detachment of the cast rod 3 from the mold 13 starts becomes less effective as the second angle $\theta 2$ approaches zero, that is, as the right inner wall surface 23 and the left inner wall surface 25 are formed into a continuous curved surface. In this case, the cast rod 3 rotates as it slides in the recessed portion 21. Therefore, when the cast rod 3 is tried to rotate, a great shear stress is generated across the interface between the cast rod 3 and the mold 13. That is, a great deal of force is required to rotate the cast rod 3, which makes it more difficult to detach the cast rod 3 from the mold 13. Therefore, too small a second angle θ2 is not preferred. Preferably, the second angle θ2 is, for example, 3 degrees or more and 30 degrees or less.

First Modification

Figure 7:
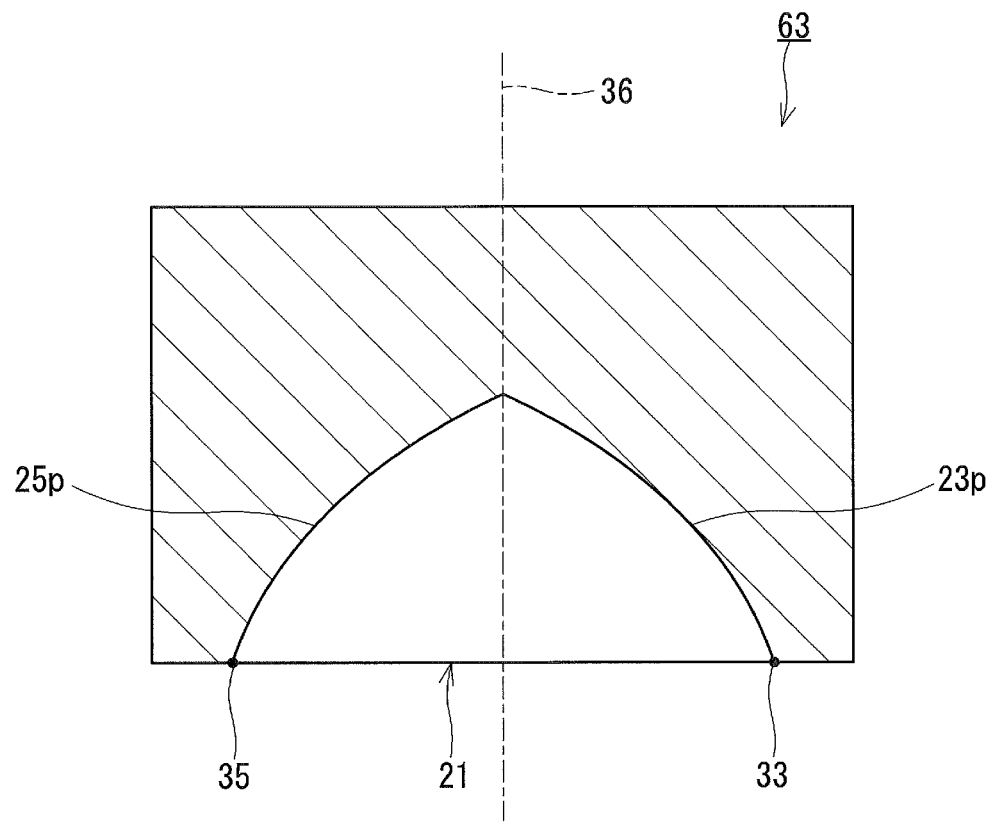
FIG. 7 is a horizontal sectional view of a mold according to a first modification.

As shown in FIG. 7, the recessed portion 21 of a mold 63 according to a first modification has an inner wall surface constituted by a part of the outer peripheral surface of an elliptical cylinder. That is, on the section (horizontal section) of the mold 63, the right contour 23p and the left contour 25p are each constituted by a part of an ellipse. In this mold 63, when a stress to rotate the cast rod 3 is generated, a point on the outer peripheral surface of the cast rod 3 moves along a virtual circle centered at the end point 33 or 35. As described with reference to FIG. 4, etc., this is the same as in the case where the inner wall surface is constituted by a part of the outer peripheral surface of a circular cylinder.

However, in the case where the inner wall surface of the recessed portion 21 is constituted by a part of the outer peripheral surface of an elliptical cylinder, the speed at which a point on the outer peripheral surface of the cast rod 3 moves away from the inner wall surface of the recessed portion 21 with the rotation of the cast rod 3 is faster than that in the case where the inner wall surface of the recessed portion 21 is constituted by a part of the outer peripheral surface of a circular cylinder. The ratio of the speed in the case of an ellipse to the speed in the case of a circle is proportional to the extension ratio at which the circle is deformed into the ellipse.

The contour may be constituted by a part of a curved line other than a circular curve and an elliptic curve, for example, a part of a curved line such as a sine curve, as long as the rotation of the cast rod 3 is allowed. Furthermore, the inner wall surface may be constituted by a part of a sphere.

Second Modification

Figure 8:
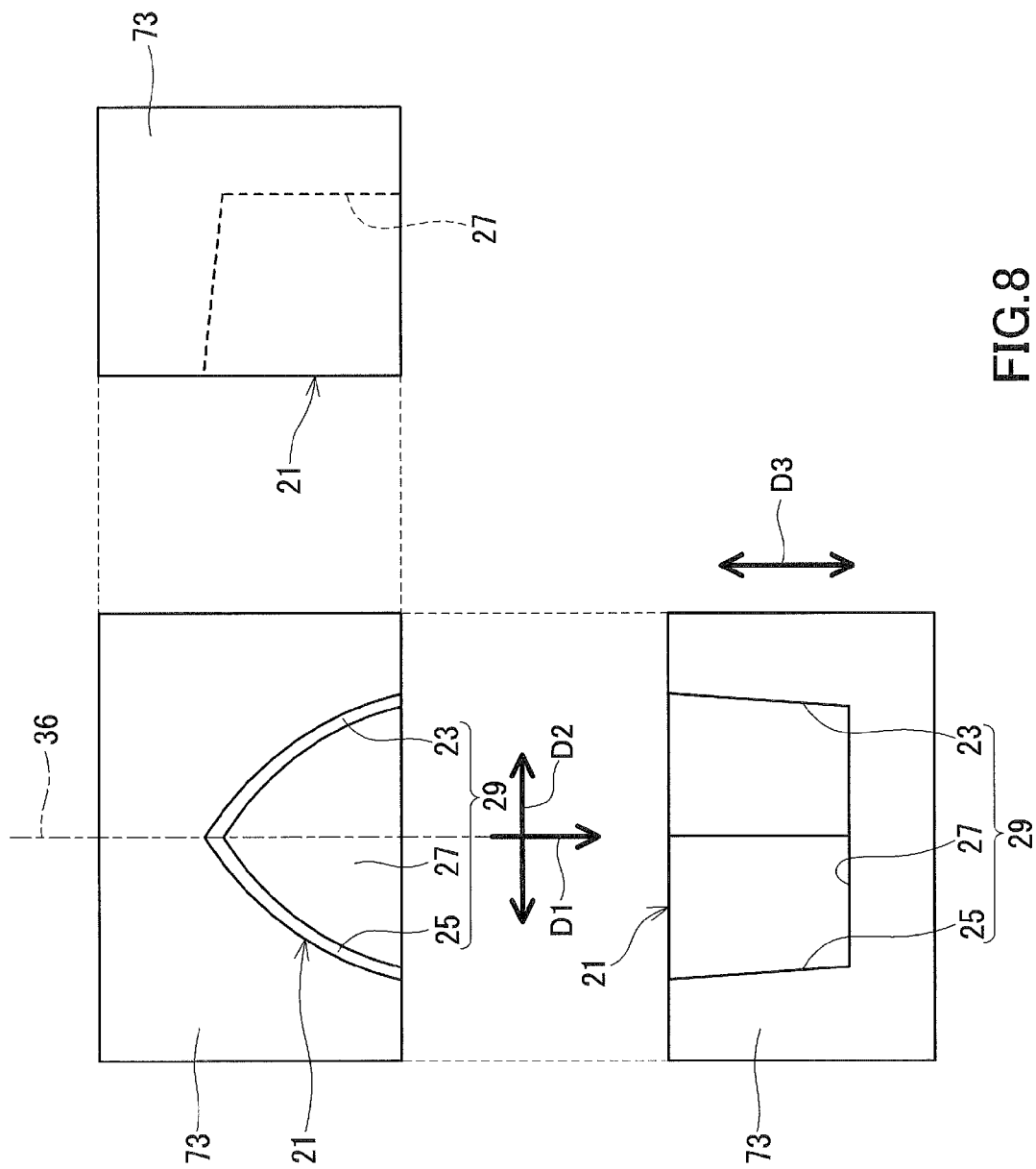
FIG. 8 is a three-view drawing of a mold according to a second modification.

FIG. 8 is a three-view drawing of a mold 73 according to a second modification. The inner wall surface 29 of the mold 73 is tapered. That is, the distance between the right inner wall surface 23 and the left inner wall surface 25 in the width direction D2 increases (preferably increases continuously and monotonously) with distance from the bottom surface 27 in the height direction D3 perpendicular to the withdrawal direction D1 and the width direction D2. Since the top of the recessed portion 21 is opened, a stress generated in the cast rod 3 in the height direction D3 can be relieved efficiently by the tapered inner wall surface 29.

Second Embodiment

Next, a casting apparatus according to a second embodiment is described. In the second embodiment, the same reference numerals are used to designate the same parts as in the first embodiment, and the description thereof is omitted.

Figure 9:
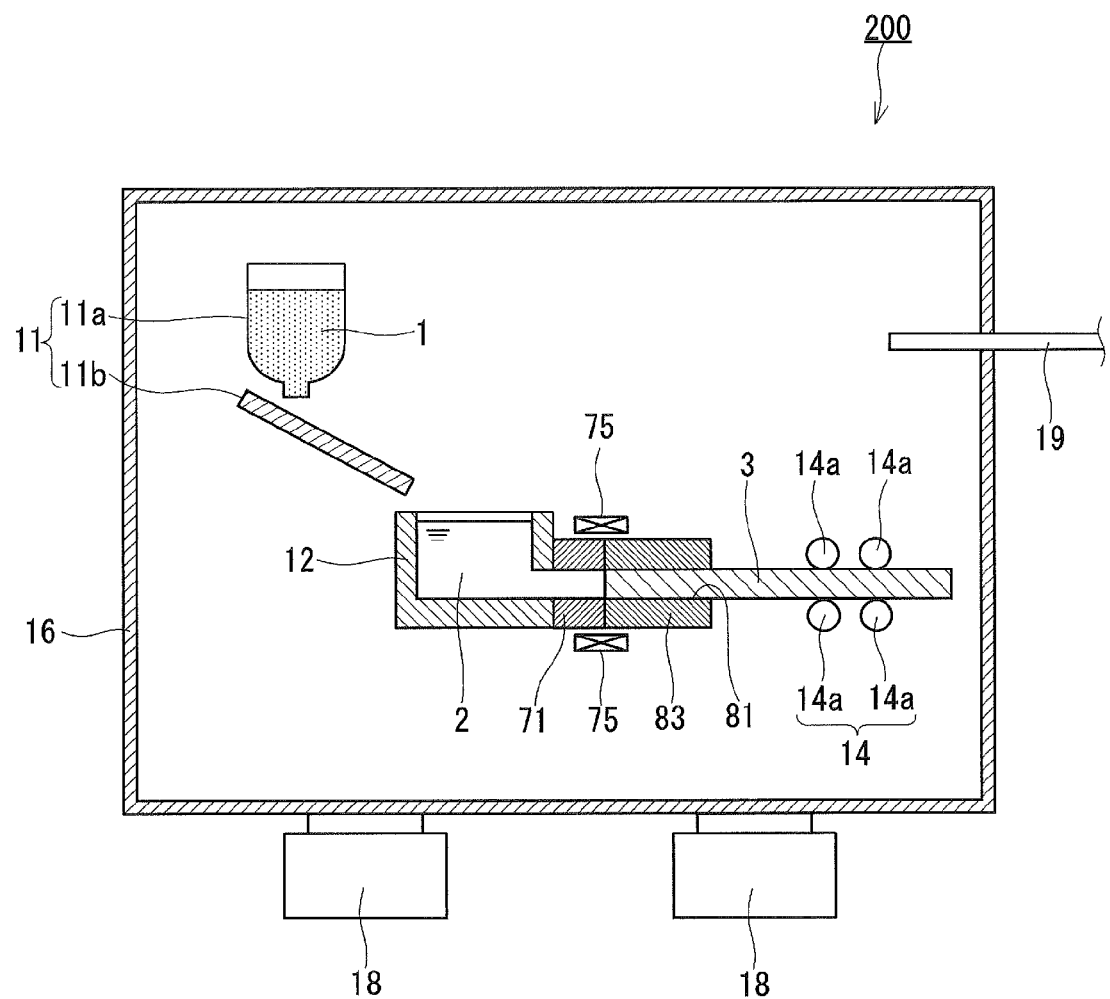
FIG. 9 is a schematic diagram of a casting apparatus according to a second embodiment of the present invention.

As shown in FIG. 9, a casting apparatus 200 of the present embodiment includes a mold 83 and a nozzle 71. The mold 83 is connected to the crucible 12 via the nozzle 71.

Figure 10A:
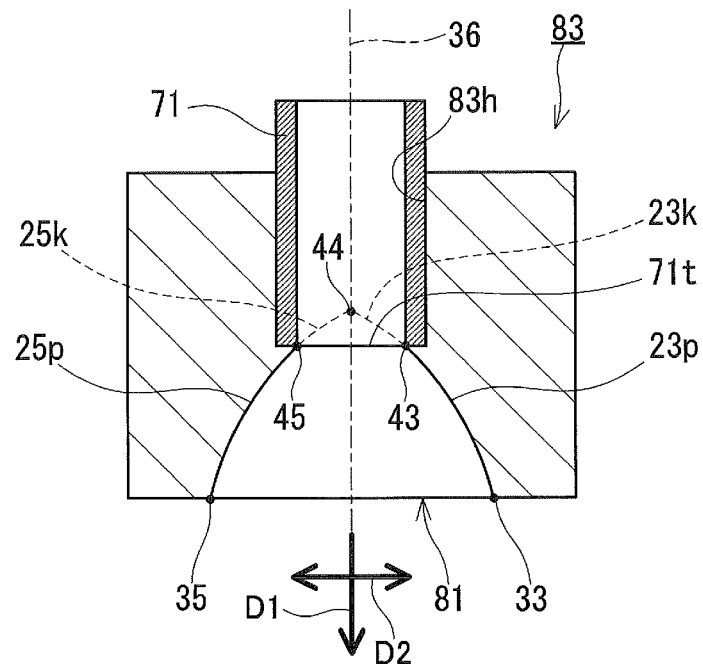
FIG. 10A is a horizontal sectional view of a mold according to the second embodiment, taken along the line XA-XA.
Figure 10B:
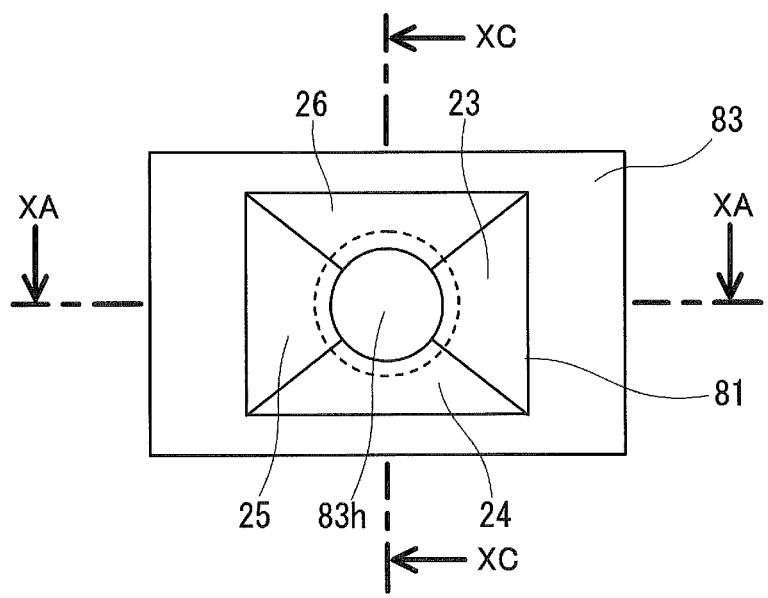
FIG. 10B is a front view of the mold according to the second embodiment.
Figure 10C:
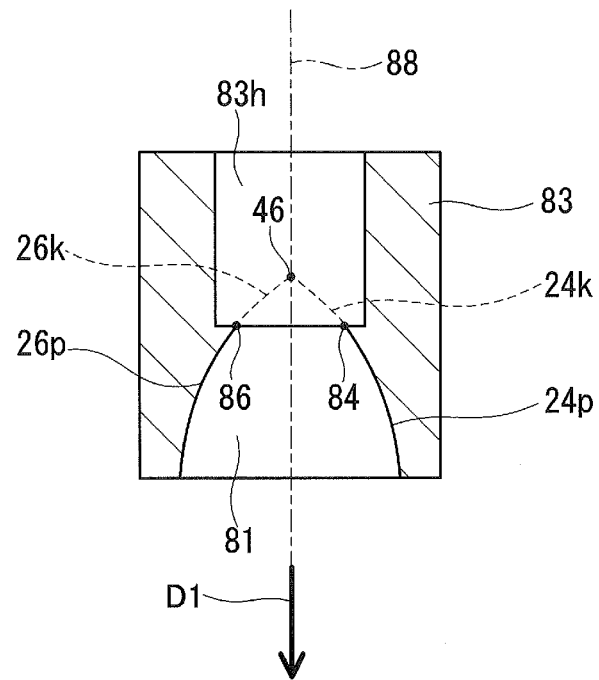
FIG. 10C is a vertical sectional view of the mold according to the second embodiment, taken along the line XC-XC.

As shown in FIG. 10A to FIG. 10C, the mold 83 includes a recessed portion 81 for receiving the melt 2 and a nozzle hole 83h serving as a port for feeding the melt 2 to the recessed portion 81. The melt 2 can be fed from the crucible 12 to the recessed portion 81 of the mold 83 through the nozzle hole 83h. The recessed portion 81 opens only in the withdrawal direction D1, and the top thereof is closed. The nozzle hole 83h allows the most upstream part of the recessed portion 81 in the withdrawal direction D1 to communicate with the outside of the mold 83. When the mold 83 is mounted in the casting apparatus 200, the crucible 12 is connected to the nozzle hole 83h of the mold 83 by the nozzle 71 so that the melt 2 can be fed from the crucible 12 to the recessed portion 81 of the mold 83. A heater 75 is provided outside the nozzle 71 so that the melt 2 of the material 1 is fed to the mold 83 while the material 1 remains molten.

The nozzle 71 is typically made of graphite, and may be made of a refractory material containing alumina, silica, a mixture of these as a main component (a component which is the highest in mass content), or the like. As the heater 75, a heater employing a heating method, such as resistance heating, induction heating, arc discharge heating or electron beam irradiation heating, can be used. It is relatively easy to heat the nozzle 71 by the heater 75 including a resistance heater. When the heating capacity is inadequate, an induction heater may be used as the heater 75 to directly heat the melt 2 in the nozzle 71. The heater 75 also serves to adjust the solidification rate and solidification position of the material 1 in the mold 83.

As shown in FIG. 10B, the recessed portion 81 of the mold 83 is constituted by a right inner wall surface 23, a left inner wall surface 25, a lower inner wall surface 24, and an upper inner wall surface 26. The inner wall surfaces 23 to 26 are each constituted by a part of the outer peripheral surface of a circular cylinder. The right inner wall surface 23 and the left inner wall surface 25 are symmetrical with respect to the symmetry plane 36. The lower inner wall surface 24 and the upper inner wall surface 26 also are symmetrical with respect to a symmetry plane not shown.

Basically, the mold 83 of the present embodiment satisfies the same requirements as those satisfied by the mold 13 described in the first embodiment. That is, on a horizontal section shown in FIG. 10A, the shape of the recessed portion 81 is determined so that the cast rod 3 can be rotationally displaced clockwise or counterclockwise about an axis passing through the right end point 33 or the left end point 35 and perpendicular to the horizontal section. The requirements to allow the rotation of the cast rod 3 are as described in the first embodiment. Furthermore, the mold 83 of the present embodiment satisfies the requirements to allow the rotation of the cast rod 3 not only on the horizontal section but also on the vertical section including the symmetry plane 36.

In the mold 83 of the present embodiment, the left inner wall surface 23 and the right inner wall surface 25 show the right contour 23p and the left contour 25p each extending along the withdrawal direction D1 from the end of the nozzle hole 83h. The right start point 43 and the left start point 45 are each located at the exit end of the nozzle hole 83h. The right contour 23p and the left contour 25p are each constituted by a circular arc or a part of an ellipse, and are symmetrical with respect to the symmetry plane 36. As shown in FIG. 10A, the intersection point of the symmetry plane 36 and two virtual lines 23k and 25k obtained by virtually extending the right contour 23p and the left contour 25p to the upstream side of the withdrawal direction D1 along the ellipse or the circular arc is defined as a virtual start point 44. A curved line formed by these two virtual lines 23k and 25k has a cusp at this virtual start point 44. The first angle θ1 and the second angle θ2, which are described in the first embodiment, can each be defined using the virtual start point 44.

As shown in FIG. 10B and FIG. 10C, in the mold 83 of the present embodiment, the lower inner wall surface 24 and the upper inner wall surface 26 show a lower contour 24p and an upper contour 26p each extending along the withdrawal direction D1 from the end of the nozzle hole 83h. A lower start point 84 and an upper start point 86 are each located at the exit end of the nozzle hole 83h. The lower contour 24p and the upper contour 26p are each constituted by a circular arc or a part of an ellipse, and are symmetrical with respect to a second symmetry plane 88. The second symmetry plane 88 is a virtual plane that divides the space occupied by the recessed portion 81 into upper and lower symmetrical parts. The intersection point of the second symmetry plane 88 and two virtual lines 24k and 26k obtained by virtually extending the upper contour 24p and the lower contour 26p to the upstream side of the withdrawal direction D1 along the ellipse or the circular arc is defined as a second virtual start point 46. A curved line formed by these two virtual lines 24k and 26k has a cusp at this second virtual start point 46. The first angle θ1 and the second angle θ2, which are described in the first embodiment, can each be defined using the second virtual start point 46. The virtual start point 44 shown in FIG. 10A coincides with the virtual start point 46 shown in FIG. 10C.

As described above, the mold 83 of the present embodiment may be configured to allow the rotation of the cast rod 3 on the horizontal plane and the rotation thereof on the vertical plane.

In the present embodiment, the center of the nozzle 71 and the center of the nozzle hole 83h coincide with the central axis of the cast rod 3. The nozzle 71 is inserted into the nozzle hole 83h, and the tip 71t of the nozzle 71 is located at the boundary between the recessed portion 81 and the nozzle hole 83h. That is, when the melt 2 is fed to the recessed portion 81 through the nozzle 71, the inner peripheral surface of the nozzle hole 83h does not contact the melt 2. However, if the mold 83 is made of graphite and the material 1 can be kept molten in the nozzle hole 83h by heating the mold 83, the inner peripheral surface of the nozzle hole 83h may contact the melt 2.

In the present embodiment, the inner diameter of the nozzle 71 is set equal to the width of the recessed portion 81 at the start points 43 and 45, i.e., to the distance between the right start point 43 and the left start point 45. Thus, it can be ensured that the interference between the rotating cast rod 3 and the nozzle 71 is avoided. On the other hand, if the inner diameter of the nozzle 71 is smaller than the distance between the right start point 43 and the left start point 45, the cast rod 3 may interfere with the nozzle 71, depending on where in the recessed portion 81 the melt 2 solidifies. This interference can be prevented by setting the temperature of the nozzle 71 high enough to remelt the cast rod 3 when it contacts the tip of the nozzle 71. However, this method may be disadvantageous in terms of energy efficiency. The same problem occurs when the inner diameter of the nozzle 71 is larger than the distance between the right start point 43 and the left start point 45.

As in the case of the right start point 43 and the left start point 45, the inner diameter of the nozzle 71 may be set equal to the width of the recessed portion 81 at the start points 84 and 86, i.e., to the distance between the lower start point 84 and the upper start point 86.

The use of the mold 83 of the present embodiment makes it possible to produce not only a rectangular cast rod but also a cylindrical cast rod. Furthermore, the use of the mold 83 of the present embodiment does not limit the withdrawal direction D1 to the horizontal direction. That is, it is possible to keep the mold 3 vertical so that the recessed portion 81 opens upward. Thus, the melt 2 can be fed from below the mold 83 to withdraw the cast rod 3 upward. As described above, the withdrawal direction is not particularly limited in the present invention. The present invention can also be applied to vertical continuous casting.

Third Modification

Figure 11A:
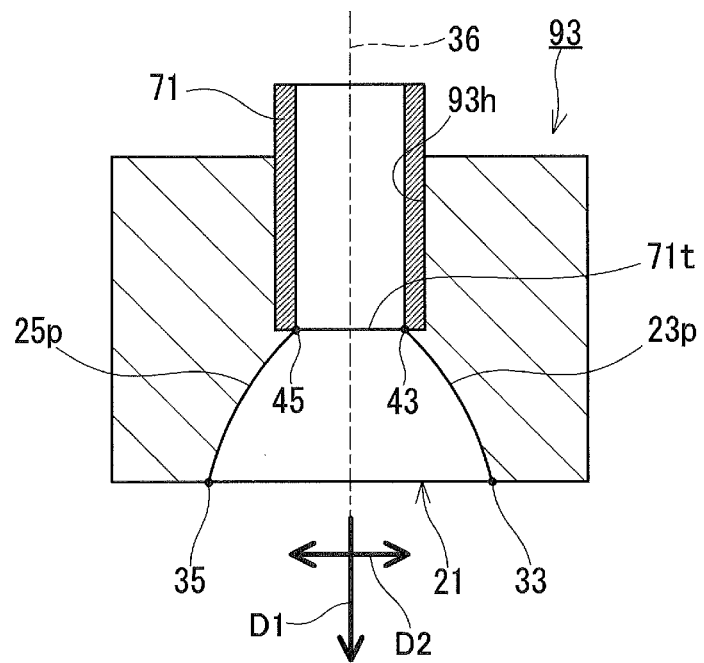
FIG. 11A is a horizontal sectional view of a mold according to a third modification, taken along the line XIA-XIA.
Figure 11B:
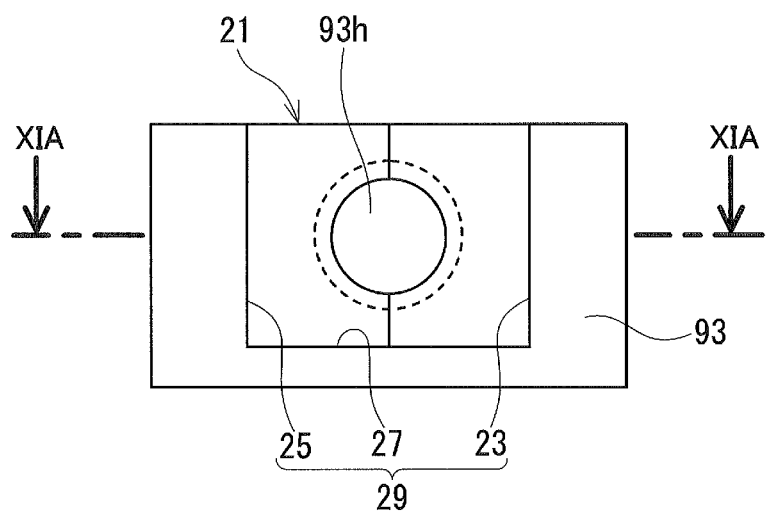
FIG. 11B is a front view of the mold according to the third modification.
Figure 11C:
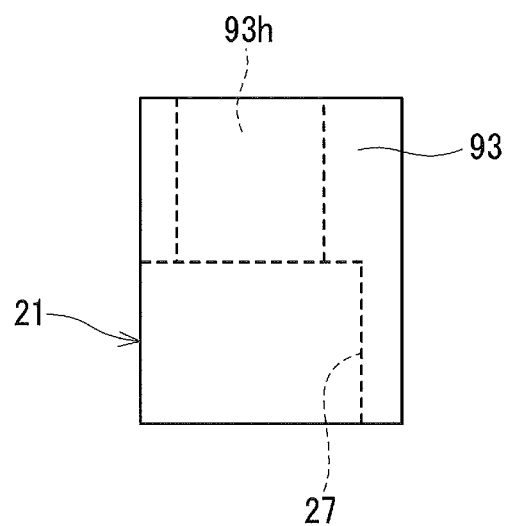
FIG. 11C is a side view of the mold according to the third modification.

A mold 93 shown in FIG. 11A to FIG. 11C includes the recessed portion 21 for receiving the melt 2 and a nozzle hole 93h serving as a port for feeding the melt 2 to the recessed portion 21. The recessed portion 21 is constituted by the right inner wall surface 23, the left inner wall surface 25, and the bottom surface 27. The right inner wall surface 23 and the left inner wall surface 25 are each constituted by a part of the outer peripheral surface of a circular cylinder. The bottom surface 27 is a flat surface. That is, the mold 93 differs from the mold 83 described with reference to FIG. 10A to FIG. 10C in that the top of the mold 93 is opened. The mold 93 also differs from the mold 13 described with reference to FIG. 3, etc. in that the mold 93 is provided with the nozzle hole 93h. The structure of the mold 93 is the same as that of the mold 13 of the first embodiment except for the nozzle hole 93h.

Third Embodiment

Figure 12A:
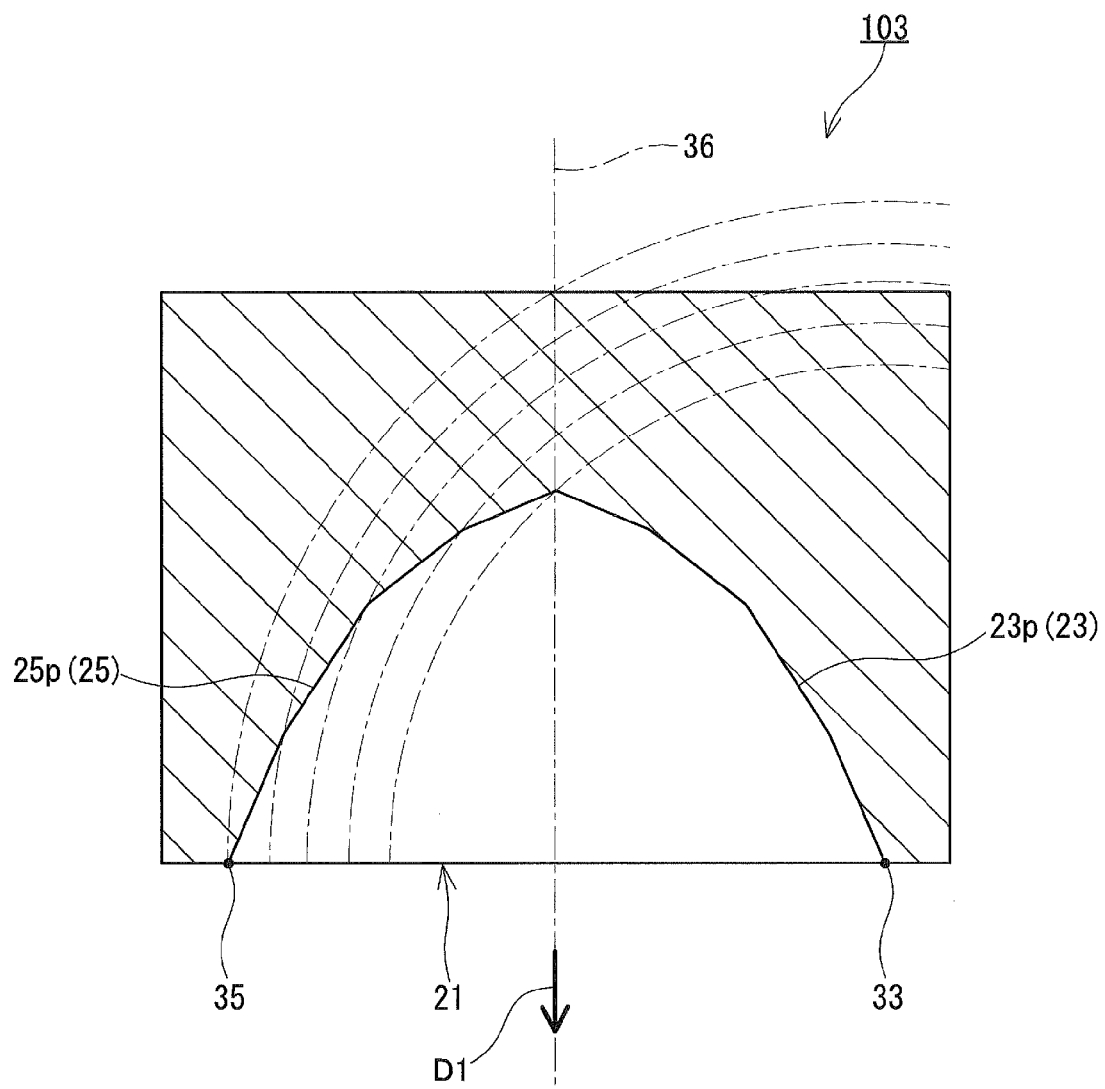
FIG. 12A is a horizontal sectional view of a mold according to a third embodiment of the present invention.

As shown in FIG. 12A, in a mold 103 of the present embodiment, the recessed portion 21 has the right inner wall surface 23 and the left inner wall surface 25. On a section (horizontal section of the recessed portion 21) observed when the recessed portion 21 is cut along a reference plane parallel to the withdrawal direction D1, the right inner wall surface 23 shows the right contour 23p extending along the withdrawal direction D1. Likewise, the left inner wall surface 25 shows the left contour 25p extending along the withdrawal direction D1. The right contour 23p and the left contour 25p are each constituted by a plurality of line segments. This means that the right inner wall surface 23 and the left inner wall surface 25 are each constituted by a combination of planes. Except for this point, the structure of the mold 103 is the same as that of the mold 13 described in the first embodiment.

Basically, the mold 103 of the present embodiment satisfies the same requirements as those satisfied by the mold 13 described in the first embodiment. That is, on the horizontal section shown in FIG. 12A, the shape of the recessed portion 21 is determined so that the cast rod 3 can be rotationally displaced clockwise or counterclockwise about an axis passing through the right end point 33 or the left end point 35 and perpendicular to that horizontal section. The requirements to allow the rotation of the cast rod 3 are as described in the first embodiment. That is, when a virtual circle centered at the first end point 33 (or the second end point 35) and passing through an arbitrary point on the right contour 23p (or the left contour 25p) is drawn on the horizontal section shown in FIG. 12A, the virtual circle intersects the right contour 23p or the left contour 25p only at that arbitrary point, or the virtual circle overlaps the right contour 23p or the left contour 25p.

The right contour 23p and the left contour 25p do not necessarily have to be curved lines, as in the present embodiment. Furthermore, the right contour 23p and the left contour 25p may each be constituted by a plurality of line segments or by at least one line segment and at least one curved line. The cast rod 3 can be withdrawn smoothly from the mold 103 as long as the rotation of the cast rod 3 is allowed.

Fourth Modification

Figure 12B:
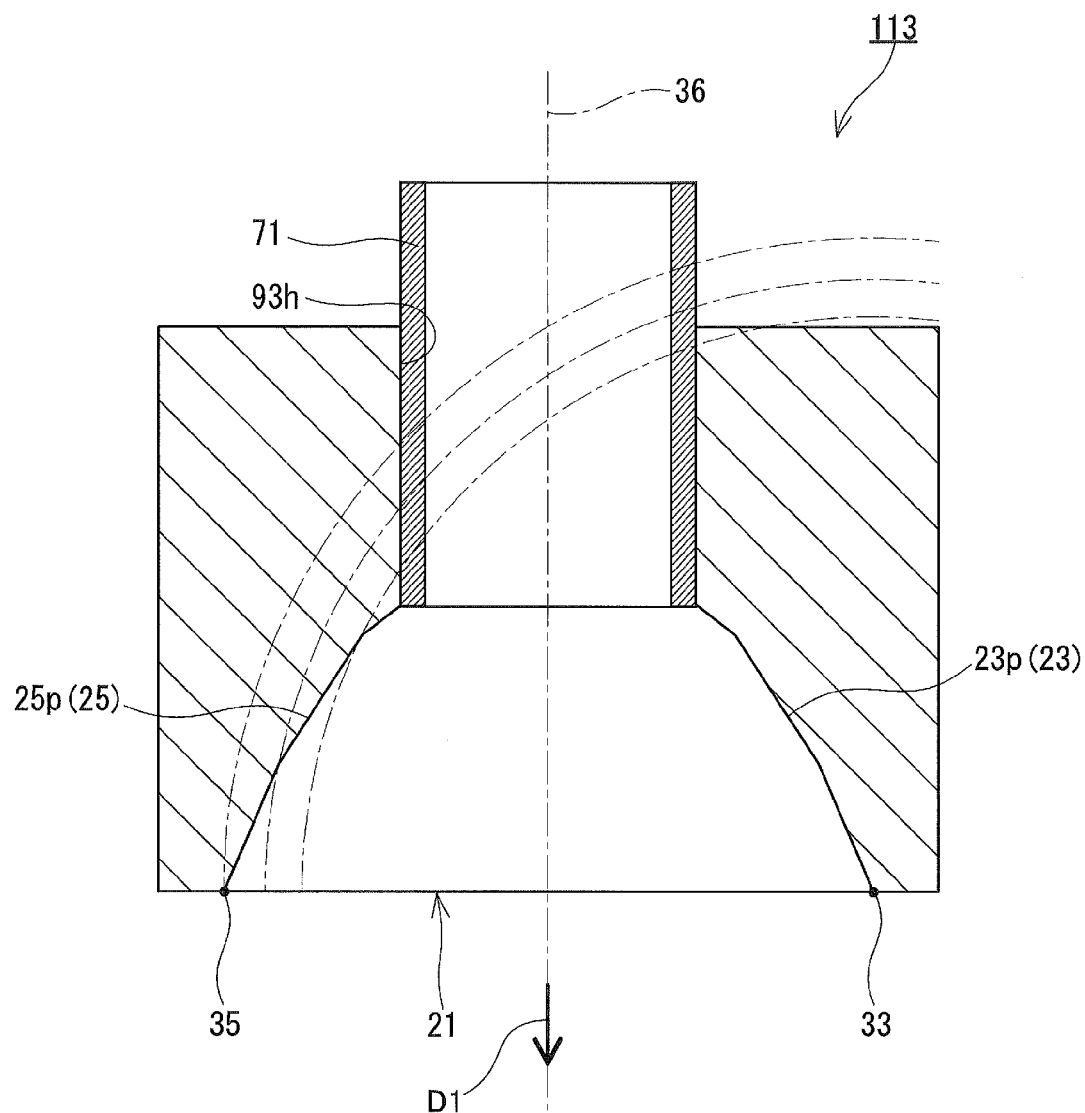
FIG. 12B is a front view of the mold according to a fourth modification.

As shown in FIG. 12B, a mold 113 includes the recessed portion 21 for receiving the melt 2 and the nozzle hole 93h serving as a port for feeding the melt 2 to the recessed portion 21. The mold 113 has the same structure as that of the mold 83 or 93 described in the second embodiment, except that on the horizontal section of the recessed portion 21, the right contour 23p and the left contour 25p are each constituted by a plurality of line segments. When a virtual circle centered at the first end point 33 (or the second end point 35) and passing through an arbitrary point on the right contour 23p (or the left contour 25p) is drawn on the horizontal section shown in FIG. 12A, the virtual circle intersects the right contour 23p or the left contour 25p only at that arbitrary point, or the virtual circle overlaps the right contour 23p or the left contour 25p. Thus, the rotation of the cast rod 3 is allowed.

The right contour 23p and the left contour 25p may each be constituted by a plurality of line segments or by at least one line segment and at least one curved line, as in the third embodiment. The top of the recessed portion 21 may be closed as described with reference to FIG. 10A to FIG. 10C, or may be opened as described with reference to FIG. 11A to FIG. 11C.

(Others)

The present invention provides a technique applicable to continuous casting. The term "continuous" does not necessarily mean that the steps of feeding a material to a crucible, melting the material in the crucible, feeding a melt into a mold, and withdrawing a cast rod are performed simultaneously. These steps do not have to be performed continuously. That is, the material may be fed to the crucible intermittently. The melt may be fed from the crucible to the mold intermittently. The cast rod may be withdrawn from the mold intermittently. For example, each of these steps may be performed about once every several seconds.

EXAMPLES

As molds of Examples and Comparative Examples, a plurality of molds with the same structure of the mold described with reference to FIG. 3, etc. as a basic structure but with different second angles θ2 (start angles) and/or third angles θ3 (end angles) were fabricated. That is, the inner wall surfaces of these molds were each constituted by a part of the outer peripheral surface of a circular cylinder. FIG. 13A to FIG. 13I show the plan views of the molds of Comparative Example 1, Examples 1 to 3, Comparative Example 2, and Examples 4 to 7. Casting was performed using each of these molds under the following conditions, and the tension required to withdraw a cast rod was measured. The required tension was measured by the following method. Specifically, a load cell was mounted on the rear end of the cast rod, and the maximum load at which the cast rod was withdrawn from the mold via the load cell was recorded as the required tension. Table 1 shows the results.

Material: Silicon
Material feed rate: 20 g/min.
Melt temperature: 1800° C.
Mold material: Copper (water-cooled)
Shape of the cast rod: Rectangular rod
Width of the cast rod (distance between the right end point and the left end point): 55 mm
Height of the cast rod: 40 mm

TABLE 1

|  | θ2 (degrees) | θ3 (degrees) | Required tension (N) |
| --- | --- | --- | --- |
| Com. Example 1 | 0 | 87 | >100 |
| Example 1 | 3 | 87 | 80 |

TABLE 1-continued

|  | θ2 (degrees) | θ3 (degrees) | Required tension (N) |
| --- | --- | --- | --- |
| Example 2 | 20 | 87 | 42 |
| Example 3 | 30 | 87 | 0.57 |
| Com. Example 2 | 40 | 87 | >100 |
| Example 4 | 30 | 90 | 0.88 |
| Example 5 | 30 | 80 | 0.07 |
| Example 6 | 30 | 70 | 0.02 |
| Example 7 | 30 | 60 | 0.01 |

The molds of Examples 1 to 3 and Comparative Examples 1 and 2 all have the same third angle θ3 of 87 degrees, but have various second angles θ2 ranging from 0 to 40 degrees. The molds of Comparative Examples 1 and 2 have second angles θ2 of 0 degrees and 40 degrees, respectively. That is, the mold of Comparative Example 1 does not have an apical angle at the position of the start point. Therefore, in Comparative Example 1, the cast rod could not be withdrawn even at a load of 100 N because the rotational movement of the cast rod did not occur. The mold of Comparative Example 2 is designed not to allow the rotational displacement of the cast rod. Therefore, the cast rod could not be withdrawn even at a load of 100 N.

The molds of Examples 1 to 3 has second angles θ2 of 3 degrees or more and 30 degrees or less. When the molds of Examples 1 to 3 were used, the cast rods could be withdrawn. In particular, when the mold of Example 3 was used, the required tension was 0.57 N. That is, very little force was required to withdraw the cast rod.

The molds of Examples 4 to 7 all have the same second angle θ2 of 30 degrees, but have various third angles θ3 ranging from 60 to 90 degrees. When the molds of Examples 4 to 7 were used, the cast rods could be withdrawn very smoothly without failure of withdrawal.

INDUSTRIAL APPLICABILITY

The present invention can be suitably applied to the casting of materials, such as silicon, which expand during solidification. A cast rod produced by the method according to the present invention can be used for the production of electronic devices, electrical storage devices, recording media, etc. The cast rod produced by the method according to the present invention can also be used as a source rod or a seed rod for silicon purification processes such as the FZ process and CZ process.

The invention claimed is:

1. A mold for producing a cast rod of a material by feeding a melt of the material to the mold and while solidifying the fed material therein, withdrawing a solidified portion of the material, the mold comprising a recessed portion for receiving the melt, wherein the recessed portion is constituted by an inner wall surface for converting the melt into the solidified portion when the inner wall surface contacts the melt, and opens in a withdrawal direction of the solidified portion, on a section of the recessed portion observed when the recessed portion is cut along a reference plane parallel to the withdrawal direction, the inner wall surface shows a first contour and a second contour each extending along the withdrawal direction, the first contour and the second contour are each constituted by a curved line, on the section, when (i) a direction perpendicular to the withdrawal direction is defined as a width direction, (ii) a most downstream position of the first contour in the withdrawal direction is defined as a first end point, (iii) a most downstream position of the second contour in the withdrawal direction is defined as a second end point, (iv) a most upstream position of the first contour in the withdrawal direction is defined as a first start point, and (v) a most upstream position of the second contour in the withdrawal direction is defined as a second start point, the first contour is connected to the second contour at a most upstream position of the recessed portion in the withdrawal direction so that the first start point coincides with the second start point on the section, a curved line formed by the first contour and the second contour has a cusp at the position of the first start point and the second start point, a distance between the first contour and the second contour in the width direction increases continuously from an upstream side to a downstream side of the withdrawal direction, and a shape of the inner wall surface of the recessed portion is determined so that the cast rod can be rotationally displaced clockwise or counterclockwise about an axis perpendicular to the section and passing through the first end point or the second end point.

2. The mold according to claim 1, wherein when a virtual circle centered at the first end point or the second end point and passing through an arbitrary point on the first contour or the second contour is drawn on the section, the virtual circle intersects the first contour or the second contour only at the arbitrary point, or the virtual circle overlaps the first contour or the second contour.

3. The mold according to claim 1, wherein the first contour and the second contour are each constituted by a circular arc or a part of an ellipse.

4. The mold according to claim 1, wherein
there is a symmetry plane that divides a space occupied by the recessed portion into two symmetrical parts,
the reference plane is a plane perpendicular to the symmetry plane and parallel to the withdrawal direction,
the first contour and the second contour are each constituted by a circular arc, and the circular arcs are symmetrical to each other with respect to the symmetry plane,
on the reference plane, when (a) an intersection point of the first contour and the symmetry plane is defined as a first intersection point, (b) a straight line connecting the first intersection point and a center of the circular arc that constitutes the first contour is defined as a start reference line, and (c) an angle formed by the symmetry plane and the start reference line is defined as a start angle $\theta 2$, the start angle $\theta 2$ is in a range of more than 0 degrees and 30 degrees or less.

5. The mold according to claim 4, wherein the start angle $\theta 2$ is in a range of 3 degrees or more and 30 degrees or less.

6. The mold according to claim 1, wherein
the mold is a mold for horizontal continuous casting, and
the withdrawal direction and the reference plane are each parallel to a horizontal direction.

7. The mold according to claim 1, wherein
a top of the recessed portion is opened so that the melt can be fed to the recessed portion by dropping the melt thereinto, and
the inner wall surface is constituted by a first inner wall surface from which the first contour is derived, a second inner wall surface from which the second contour is derived, and a bottom surface adjacent to both the first inner wall surface and the second inner wall surface.

8. A casting apparatus comprising:
a crucible for holding a melt of a material;
the mold according to claim 1, for receiving the melt from the crucible and solidifying the material; and
a conveyor for withdrawing a solidified portion of the material from the mold so as to produce a cast rod of the material.

9. The casting apparatus according to claim 8, further comprising:
a material feeder for feeding the material to the crucible; and
a heater for adjusting a solidification rate of the material in the mold.

10. The casting apparatus according to claim 8, wherein
the mold is a mold for horizontal continuous casting, and
a top of the recessed portion of the mold is opened so that the melt can be fed from the crucible to the recessed portion by dropping the melt thereinto.

11. A method for producing a cast rod, comprising the steps of:
feeding a melt of a material to the mold according to claim 1; and
while solidifying the material in the mold, withdrawing a solidified portion of the material so as to produce a cast rod of the material.

12. The method for producing a cast rod according to claim 11, wherein
the mold is a mold for horizontal continuous casting,
a top of the recessed portion of the mold is opened, and
in the feeding step, the melt is fed from a crucible to the recessed portion by dropping the melt thereinto.

13. The method for producing a cast rod according to claim 11, wherein the material is a material that undergoes volumetric expansion when the material changes from a liquid phase to a solid phase.

14. The method for producing a cast rod according to claim 13, wherein the material is silicon or a silicon compound.

15. A mold for producing a cast rod of a material by feeding a melt of the material to the mold and while solidifying the fed material therein, withdrawing a solidified portion of the material, the mold comprising:
a recessed portion for receiving the melt; and
a nozzle hole that serves as a port for feeding the melt to the recessed portion and allows a most upstream part of the recessed portion in a withdrawal direction of the solidified portion to communicate with an outside of the mold, wherein
the recessed portion is constituted by an inner wall surface for converting the melt into the solidified portion when the inner wall surface contacts the melt, and opens in the withdrawal direction,
on a section of the recessed portion observed when the recessed portion is cut along a reference plane parallel to the withdrawal direction, the inner wall surface shows a first contour and a second contour each extending along the withdrawal direction from an end of the nozzle hole,
there is a symmetry plane that divides a space occupied by the recessed portion into two symmetrical parts,
the first contour and the second contour are each constituted by a circular arc or a part of an ellipse, and are symmetrical with respect to the symmetry plane,
on the section, when (i) a direction perpendicular to the withdrawal direction is defined as a width direction, (ii) a most downstream position of the first contour in the withdrawal direction is defined as a first end point, (iii) a most downstream position of the second contour in the withdrawal direction is defined as a second end point, and (iv) an intersection point of the symmetry plane and two virtual lines obtained by virtually extending the first contour and the second contour to an upstream side of the withdrawal direction along the ellipse or the circular arc is defined as a virtual start point, a curved line formed by the two virtual lines has a cusp at the virtual start point, a distance between the first contour and the second contour in the width direction increases continuously from the upstream side to a downstream side of the withdrawal direction, and a shape of the inner wall surface of the recessed portion is determined so that the cast rod can be rotationally displaced clockwise or conterclockwise about an axis perpendicular to the section and passing through the first end point or the second end point.

16. A casting apparatus comprising:
a crucible for holding a melt of a material;
the mold according to claim 15, for receiving the melt from the crucible and solidifying the material; and
a conveyor for withdrawing a solidified portion of the material from the mold so as to produce a cast rod of the material,
wherein the crucible is connected to the nozzle hole of the mold so that the melt can be fed from the crucible to the recessed portion of the mold.

17. A method for producing a cast rod, comprising the steps of:
feeding a melt of a material to the mold according to claim 15; and
while solidifying the material in the mold, withdrawing a solidified portion of the material so as to produce a cast rod of the material,
wherein in the feeding step, the melt is fed from a crucible to the recessed portion of the mold through the nozzle hole.

18. A mold for producing a cast rod of a material by feeding a melt of the material to the mold and while solidifying the fed material therein, withdrawing a solidified portion of the material, the mold comprising a recessed portion for receiving the melt, wherein
the recessed portion is constituted by an inner wall surface for converting the melt into the solidified portion when the inner wall surface contacts the melt, and opens in a withdrawal direction of the solidified portion,
on a section of the recessed portion observed when the recessed portion is cut along a reference plane parallel to the withdrawal direction, the inner wall surface shows a first contour and a second contour each extending along the withdrawal direction,
the first contour and the second contour are each constituted by a plurality of line segments,
on the section, when (i) a direction perpendicular to the withdrawal direction is defined as a width direction, (ii) a most downstream position of the first contour in the withdrawal direction is defined as a first end point, and (iii) a most downstream position of the second contour in the withdrawal direction is defined as a second end point,
a distance between the first contour and the second contour in the width direction increases continuously from an upstream side to a downstream side of the withdrawal direction, and
a shape of the inner wall surface of the recessed portion is determined so that the cast rod can be rotationally displaced clockwise or conterclockwise about an axis perpendicular to the section and passing through the first end point or the second end point.

\* \* \* \* \*